United States Patent [19]

Ei

[11] 4,417,320
[45] Nov. 22, 1983

[54] INTERFACE FOR DATA COMMUNICATION SYSTEMS USING SERIAL BIPHASE DATA TRANSMISSIONS

[75] Inventor: David D. Ei, Ann Arbor, Mich.

[73] Assignee: Interface Systems, Inc., Ann Arbor, Mich.

[21] Appl. No.: 262,722

[22] Filed: May 11, 1981

[51] Int. Cl.³ .............................................. G06F 3/04
[52] U.S. Cl. .................................... 364/900; 307/475
[58] Field of Search ... 364/200 MS File, 900 MS File; 307/475

[56] References Cited

U.S. PATENT DOCUMENTS 3,830,962 8/1974 Mailloux .................... 364/900 X
4,048,673 9/1977 Hendrie et al. ................ 364/200
4,168,469 9/1979 Parikh et al. .................. 364/900

Primary Examiner—Thomas M. Heckler
Attorney, Agent, or Firm—Krass, Young & Schivley

[57] ABSTRACT

An interface for biphase data communication systems utilizing serial transmissions between a central control unit and a peripheral device. A ROM-latch network serving as a sequencer is utilized as a bi-directional biphase serial/TTL parallel translator. In the receiver mode the ROM-latch will step through a specific operational sequence for detecting an appropriate header and controlling a TTL parallel translation of the serial biphase data. In the transmitter mode the ROM-latch is used to reconstruct the header sequence prior to re-translating and transmitting the TTL parallel data in serial biphase format. A receiver clock generator circuit is provided for generating clock pulses for the ROM-latch in synchronism with the incoming biphase transmissions. A transmitter level converter defines the waveforms for the biphase data transmitted from the interface and is designed to provide a predistortion pulse at each voltage level transition.

20 Claims, 23 Drawing Figures

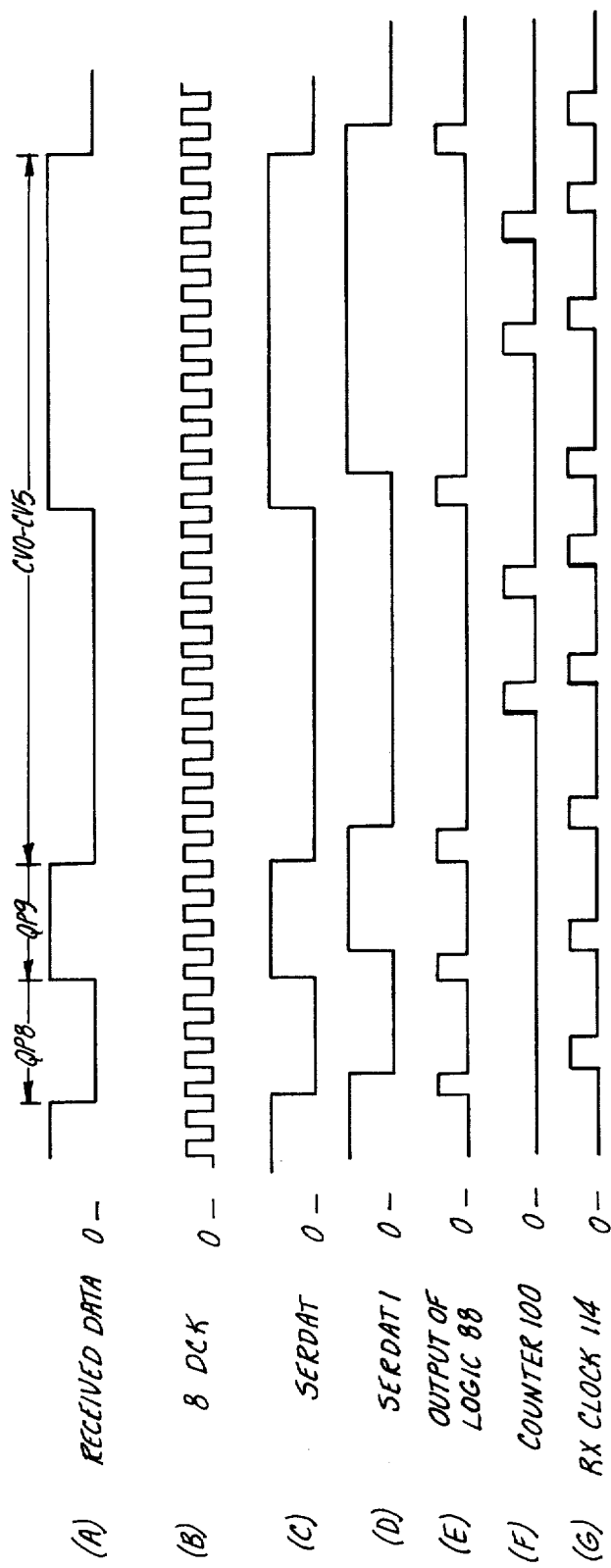
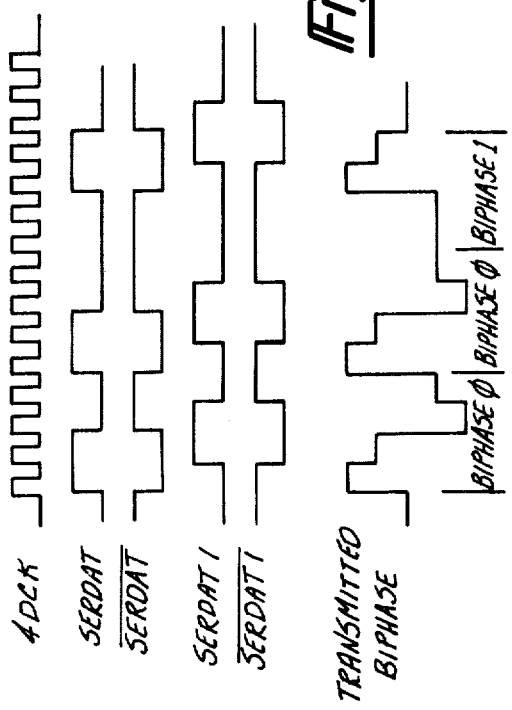

4,417,320

INTERFACE FOR DATA COMMUNICATION SYSTEMS USING SERIAL BIPHASE DATA TRANSMISSIONS

BACKGROUND OF THE INVENTION

This invention relates to data communication systems. In particular, it involves an interface which permits a wide variety of peripheral devices to be used with central control units using serial biphase data transmissions.

In general, interface systems are used to make peripheral devices such as printers, video displays, terminals, etc. compatible with a given central control unit. Often the control unit is made by one manufacturer and the peripheral device is made by another. If the operating characteristics of the control unit are different from the peripheral device, then it is impossible to use the two together. Many peripheral devices use parallel transistor-transistor logic (TTL) in which each bit of data word is operated simultaneously. In contrast, it is advantageous to transmit data from the control unit in a serial manner. Either the peripheral device or an interface must be used to convert the serial data into parallel TTL format in order for the two devices to be compatible.

In most conventional data communication systems, each bit of the serial data transmission from the control unit is represented by a constant voltage level. In other words, a voltage level of so many volts for a given bit time defines a digital zero whereas a different voltage level for that bit time defines a digital one. Since the voltage level remains constant for each bit time it is relatively easy to design an interface for converting the serial data transmissions into TTL parallel data for use by the peripheral units.

International Business Machines Corporation (IBM) has introduced its Series 3274/3276 (also known as "Type A") control units which use a dramatically different serial transmission architecture. According to the new IBM data transmission specifications, there is a voltage transition in the middle of each serial data bit. This will be referred to as a mid-bit voltage transition, or simply a mid-bit transition. A digital zero is represented by a high to low transition within a given bit time period whereas a digital one is defined by a low to high transition occuring at the mid-bit time. Each transition is accompanied by a predistortion pulse to aid in the detection of the data at remote locations. For purposes of this invention, this type of data transmission will be referred to as biphase data transmissions. FIG. 1(A) illustrates a typical biphase transmission representing two biphase zeroes followed by a biphase one.

IBM has established a new data transmission protocol which is used in conjunction with the biphase method of defining each bit. Each transmission of valid data is preceded by a header consisting of a line quiesce and a code violation. The purpose of this header is to condition the coaxial cable which carries the transmission to insure that bit and byte synchronization may be achieved. Each byte of data consists of 12 bits having a sync bit at its beginning and a parity bit at its end. The last byte of transmitted data is followed by an ending sequence as defined by IBM. FIG. 2 illustrates this protocol.

More will be said about the characteristics of such biphase data transmissions and related protocol later in the specification. However, it can be seen that conventional interface designs cannot be used to translate biphase serial transmissions to the TTL parallel format used by most peripheral units. Where in the past each bit was defined by constant voltage level for the given bit time now each bit has two discrete voltage levels for each bit time and the definition of a digital one or zero depends upon the direction of the transition. Moreover, the biphase transmissions occur at an extremely fast rate of over 2.3 megabits/second (approximately 424 nanoseconds per bit). Additionally, the voltage levels used in these biphase transmissions are relatively low. The conversion of this high frequency data transmission at low voltage levels makes it exceedingly difficult to detect and convert these transmissions into TTL parallel compatible format.

Furthermore, the task of discriminating between meaningful mid-bit transitions and meaningless between bit transitions becomes very difficult, as does the problem of sorting out valid data from invalid data used in the transmission protocol.

Additionally, the peripheral device is required to respond to commands from the control unit very quickly. This places additional burden on the interface in that it must reconstruct the header protocol, fetch and translate the TTL parallel data into biphase serial format in a timely manner. Otherwise, the control unit may assume that the peripheral device is malfunctioning and will cease communicating with it.

SUMMARY OF THE INVENTION

The present invention advantageously employs a ROM-latch network in the preferred embodiment as a sequencer in a bi-directional biphase serial/TTL parallel logic translator which translates received biphase serial data into TTL parallel data for controlling the peripheral device and, conversely, translates TTL parallel data into biphase serial data for transmission to the control unit. In the receiver mode the ROM-latch is used to detect for the correct header sequence. The voltage levels of the incoming biphase data are sampled at substantially the half bit transmission rate and used to form a portion of the address to the ROM-latch. If the correct header sequence is detected the ROM-latch proceeds to translate the biphase serial data into "standard" parallel data. In the transmitter mode the ROM-latch is programmed to provide the necessary header sequence, retranslate the parallel data into biphase serial data, and generate a required ending sequence for the transmission back to the control unit.

In the preferred embodiment a voltage level converter serves to convert the voltage levels of the serial biphase transmissions to TTL levels. The ROM has a subset of its output lines coupled to inputs of a multibit latch. A subset of the output lines of the latch are connected to selected address input lines of the ROM. The output of the voltage level converter is also connected to a given address line of the memory. A receiver clock serves to clock each memory addressing step at a rate corresponding to the half bit biphase transmission rate. A serial-to-parallel shift register is also coupled to the output of the voltage level converter. The ROM generates enabling signals on one of its output lines for clocking said shift register when given memory locations have been addressed. These selected addresses are provided by the combination of the voltage level converter signal and the feedback latch signals. These locations will be addressed and, hence, the shift register enabled, only if the ROM-latch has "stepped" through a valid header sequence. Accordingly, valid data following the header sequence may be clocked into the shift register, the output of which provides bytes of valid data in TTL parallel format.

Preferably, the shift register is a multi-purpose device which can function in a parallel to serial mode as well as in a serial to parallel mode to perform both serializing and deserializing functions. To transmit data to the control unit, one address line of the ROM is connected to the serial output line of the shift register which is placed in a parallel to serial mode. After providing the appropriate header sequence the memory will generate the necessary serial biphase transitions to correspond with each bit of the TTL parallel data in the shift register and a following ending sequence.

The receiver clock generator circuit forms another aspect of this invention. The output signals from the voltage level converter are delayed for a period substantially less than the half bit transmission rate of the biphase data. The non-delayed output signals from the voltage level converter are compared with the delayed signals and a pulse is generated whenever the levels of the two signals are different. A counter having a reset input is coupled to the output of the comparator. The counter provides an output pulse at substantially the half bit transmission rate unless reset by a pulse from the comparator. The output pulses from the comparator and the counter are combined to provide clock signals for the ROM-latch. These clock signals are derived from the comparator when there is a transition of the signal levels of the biphase data and is otherwise derived from the counter which times out at substantially the half bit transmission rate. Thus, the counter effectively artificially generates clock pulses when they cannot be generated by regularly occuring transitions of the incoming biphase transmission.

Pursuant to another feature of this invention, a transmitter level converter is provided for shaping the waveforms transmitted by the interface into biphase waveforms characterized by a predistortion pulse for each transition. Briefly, this is accomplished by a logic network which operates to selectively place two output transistors into saturation, cut off, or forward active modes as a function of the data to be transmitted. The two transistors supply the positive and negative predistortion pulses when there is a positive or negative transition of the data, respectively, when saturated and otherwise supply the normal biphase signal voltage levels when in their forward active mode. When nothing is being transmitted the transitions are cut off.

BRIEF DESCRIPTION OF THE DRAWINGS

These and other advantages of the present invention will become more apparent after reading the following specification and by reference to the drawings in which:

FIG. 5 is a timing chart showing relative timing signals associated with the generation of the receiver clock;

FIG. 8 is a timing chart showing the relative timing of signals associated with the transmitter level converter for generating biphase signal waveforms for transmission by the interface system of the present invention.

DESCRIPTION OF THE PREFERRED EMBODIMENT

A. The Biphase Data Format and Transmission Protocol

Figure 1:
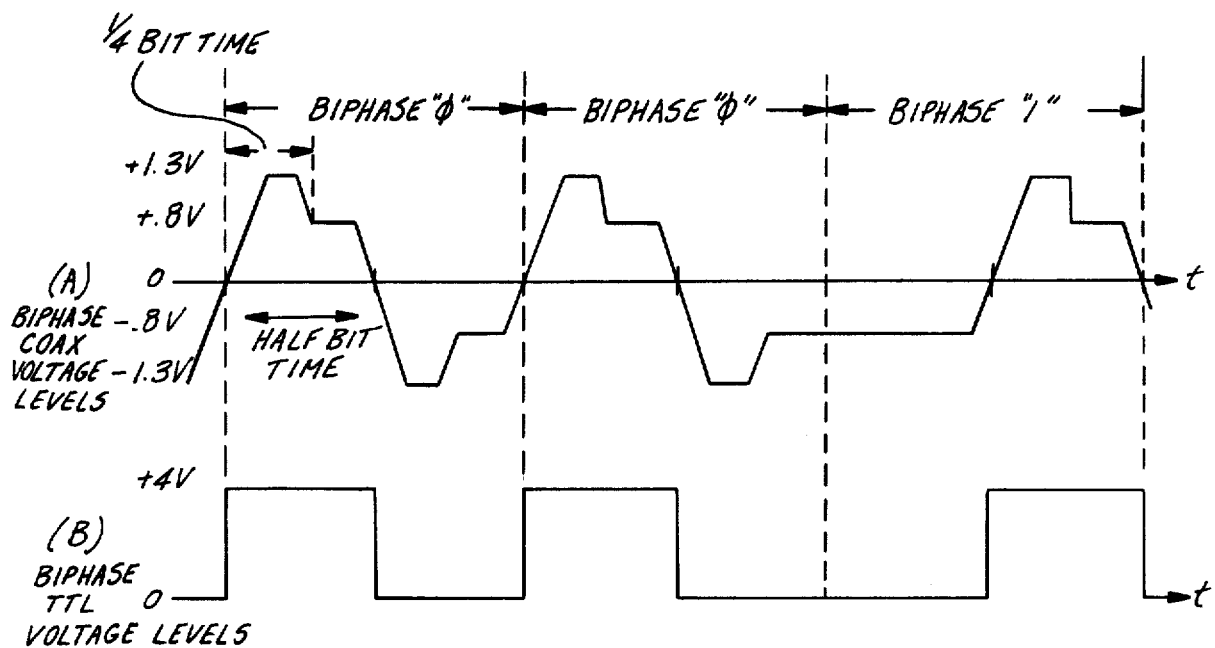
FIG. 1(A-B) is a waveform diagram showing in FIG. 1(A) a typical biphase data transmission and in FIG. 1(B) a TTL level converted form of the transmission.

As referred to above, FIG. 1A illustrates a biphase data transmission of two logical zeroes followed by a logical one. The data transmissions are provided serially over a coaxial cable from a central control unit to the peripheral device. The bit time for each of the bits is 424 nanoseconds. Each of the bits is characterized by a mid-bit transition occurring at the half bit time, i.e. 212 nanoseconds. A biphase logical zero is represented by a high level followed by a low level. In contrast, a biphase logical one is defined by a low level followed by a high level. Each transition is accomplished by a predistortion pulse characterized by a peak of +/−1.3 volts lasting for 106 nanoseconds after a zero crossing. The waveform then settles to +/−0.8 volts for the remaining portion of the half bit time. The predistortion pulse provides a surge of power at each transition to drive the coax and aid in the accurate detection and discrimination between the various signal levels. This is important where the data is transmitted over relatively long lengths of coax to a remote peripheral unit.

By using a voltage thresholding technique (to be described) the complex biphase waveform of FIG. 1A can be reduced to the TTL waveform shown in FIG. 1B.

Figure 2:
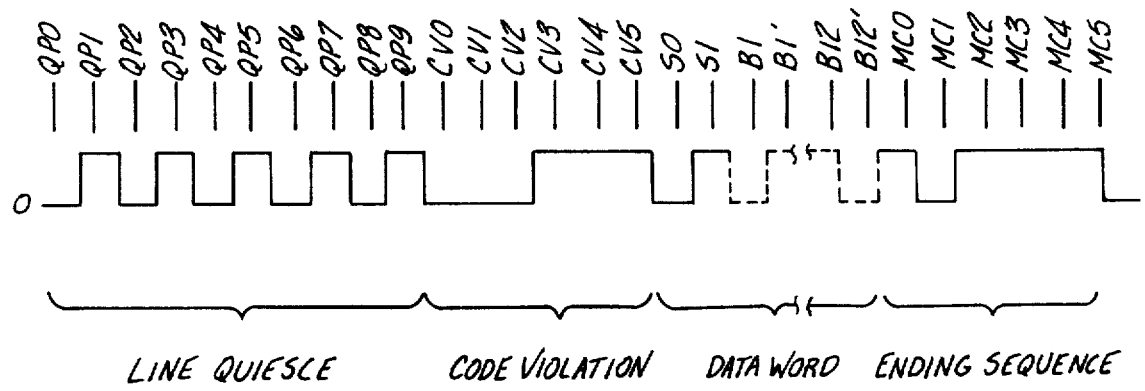
FIG. 2 is a waveform diagram illustrating the header and ending sequences of a TTL converted biphase data transmission protocol.

FIG. 2 illustrates the serial data transmission protocol defined by IBM for its Series 3274/3276 control units. Each data transmission is preceded by a header consisting of a series of five biphase ones making up a line quiesce and a code violation taking up three bit times. Valid data follows the header. Each data word or byte consists of 12 bits starting with a sync bit and ending with a parity bit. An ending sequence as shown in FIG. 2 follows the termination of valid data transmission. The line quiesce pattern is used to establish an equilibrium switching condition on the coaxial cable. The code violation helps to differentiate between the quiesce pattern and the state of the valid data following the code violation. The ending sequence is used by the receiver demodulation logic for resetting purposes to mark the end of a transmission.

It can thus be seen that for proper communication between the control unit and the peripheral device that each transmission, be it from the control unit or the peripheral device, must strictly adhere to the protocol set forth above. Further information on the definition of the biphase waveform and transmission protocol may be obtained from IBM. Its publication entitled "IBM 3274, 3276 Control Unit To Device Product Attachment Information", dated Oct. 19, 1977 as revised on May 15, 1978 and Sept. 15, 1978 is hereby incorporated by reference. cl B. Overview of the Interface System Turning to FIG. 3, the interface system 10 of the present invention is connected between the control unit and a peripheral device. Communication occurs bidirectionally through interface system 10 over coaxial cable 12. Interface 10 is specifically designed to make conventional peripheral devices (i.e. those not having biphase communication capabilities) compatible with control units using the aforementioned biphase data format and transmission protocol. From a data processing standpoint interface 10 is effectively invisible to the control unit or peripheral device but it makes them mutually compatible. Accordingly, an IBM Series 3274/3276 control unit may be used in connection with a peripheral unit made by another manufacturer (or compatible with other IBM control units) not otherwise capable of deciphering biphase data transmissions or the defined protocol.

In the receiver mode, the biphase transmission from the control unit over cable 12 is converted by a receiver level converter 14 which serves to convert the biphase complex waveforms at low voltage levels to simpler TTL compatible signals at higher (standard) voltages. Receiver level converter 14 is connected to a receiver clock generator 16 and to a bi-directional biphase serial/TTL parallel logic translator 18. The receiver clock generator 16 in cooperation with the master clock 20 serves to generate clock signals in synchronism with the incoming transmission. As will be more fully described herein, clock generator 16 provides clock signals for clocking the various components of translator 18 at the half bit transmission rate; i.e. twice the normal data clock rate.

Mode control logic 22 conditions the ROM-latch 24 to perform either deserialization (receiver mode) or serialization (transmitter mode) functions.

ROM-latch 24 samples the data at the half bit transmission rate via clock signals from receiver clock 16. It determines whether the correct sequence of voltage levels corresponding to the header of FIG. 2 are present in the incoming data. If the correct header sequence is detected the ROM-latch 24 will provide an enabling signal to a serial/parallel shift register 26 and will begin clocking subsequently received valid data into it. ROM-latch 24 will generate clock pulses to the shift register such that only one-half of each biphase data bit is shifted into it thereby translating the biphase bits into standard bits which are loaded into the shift register and converted to parallel format. At the end of each data word ROM-latch 24 will check for correct parity. If parity is correct ROM-latch 24 will generate a latch clock signal which will cause the output of shift register 26 to be loaded into a receiver register 28 and a flip flop 30 will be set to act as a flag to notify controller 34 that data is available. The loading of register 28 will also set a command flip flop 32.

Assuming that the correct header sequence and good parity have been detected by ROM-latch 24, this sequence will continue for each word of data received from the control unit over coax 12. However, if an incorrect sequence is detected or parity is improper, ROM-latch 24 will reset itself to its starting position and thereby never reach the position in its sequence that provides the enabling signals for further processing of the received data, i.e. rejecting all transmissions until a new header sequence is supplied.

Assuming the transmission is correct, controller 34 using a bit slice sequencer may enable bi-directional transceiver bus 36 to permit the contents of the receiver register 28 to be read. Sequencer 34 will carry out certain designated functions using the contents of register 28 as control inputs. Generally, controller 34 handles all coax transmission protocol and commands relative to them. For example, controller 34 may respond to a command instruction by reading or writing information into a memory 38 through direct memory access circuitry 40. Other more specific data instructions directed to the particular peripheral are carried out in microprocessor 42. If, for example, the peripheral device is a printer then microprocessor 42 will handle all data and printing protocols such as converting unique character data formats (such as EBCDI) into character formats (e.g. ASCII) which the printer is designed to use. Depending upon the peripheral, microprocessor 42 may communicate with it by way of RS232 serial output lines 44 or parallel ports 46.

It is necessary for the peripheral device to respond to control unit commands by transmitting certain information back to the control unit. Assume, for example, that the control unit desires to ascertain the contents of one of the status registers residing in control logic 48. Controller 34 will condition the bi-directional transceiver bus 36 such that the contents of the particular register in control logic 48 will be placed into the transmitter register 50. The loading of transmitter register 50 signals mode control logic 22 to place ROM-latch 24 into the transmitter mode. ROM-latch 24 in conjunction with mode control logic 22 operates to reconstruct the header sequence shown in FIG. 2 prior to transmission of the data to the control unit. After the generation of the sync bit the shift register 26 is reconfigured into a parallel in-serial out mode. For every TTL logical zero in shift register 26 the ROM-latch 24 will generate a one to zero voltage transition corresponding to the biphase data format. Similarly, the ROM-latch provides a zero to one voltage transition corresponding to a biphase one for every TTL logical one. The ROM-latch will also provide the necessary ending sequence at the end of the data transmission.

The transmitter level converter 52 operates to shape the thus translated biphase serial information into the necessary biphase waveform characterized by the predistortion pulses and voltage levels noted above. Briefly, this is accomplished by selectively biasing output transistors in converter 52 whenever a transition is to be made. Provision is made for detecting such transitions and placing the output transistors successively in saturation and then in their forward active regions as a function of the data to be transmitted.

DETAILED DESCRIPTION OF THE INTERFACE SYSTEM

Figure 3:
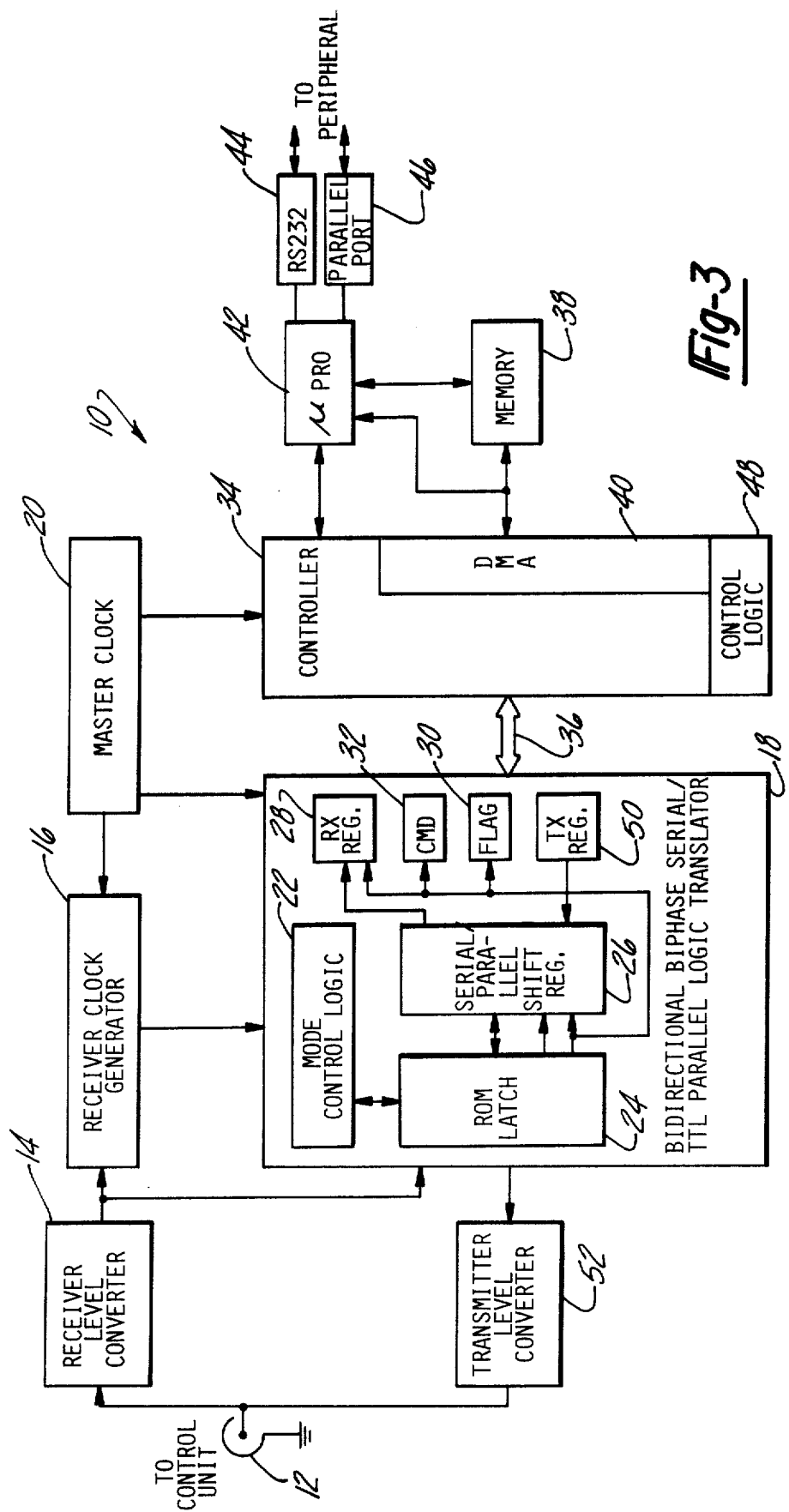
FIG. 3 is a block diagram of an interface system made in accordance with the preferred embodiment of this invention.

To the extend possible, those components making up the functional blocks shown in FIG. 3 will be encompassed by a dotted line bearing the associated reference numeral.

C. Receiver Level Converter and Clock Generator

Figure 4:
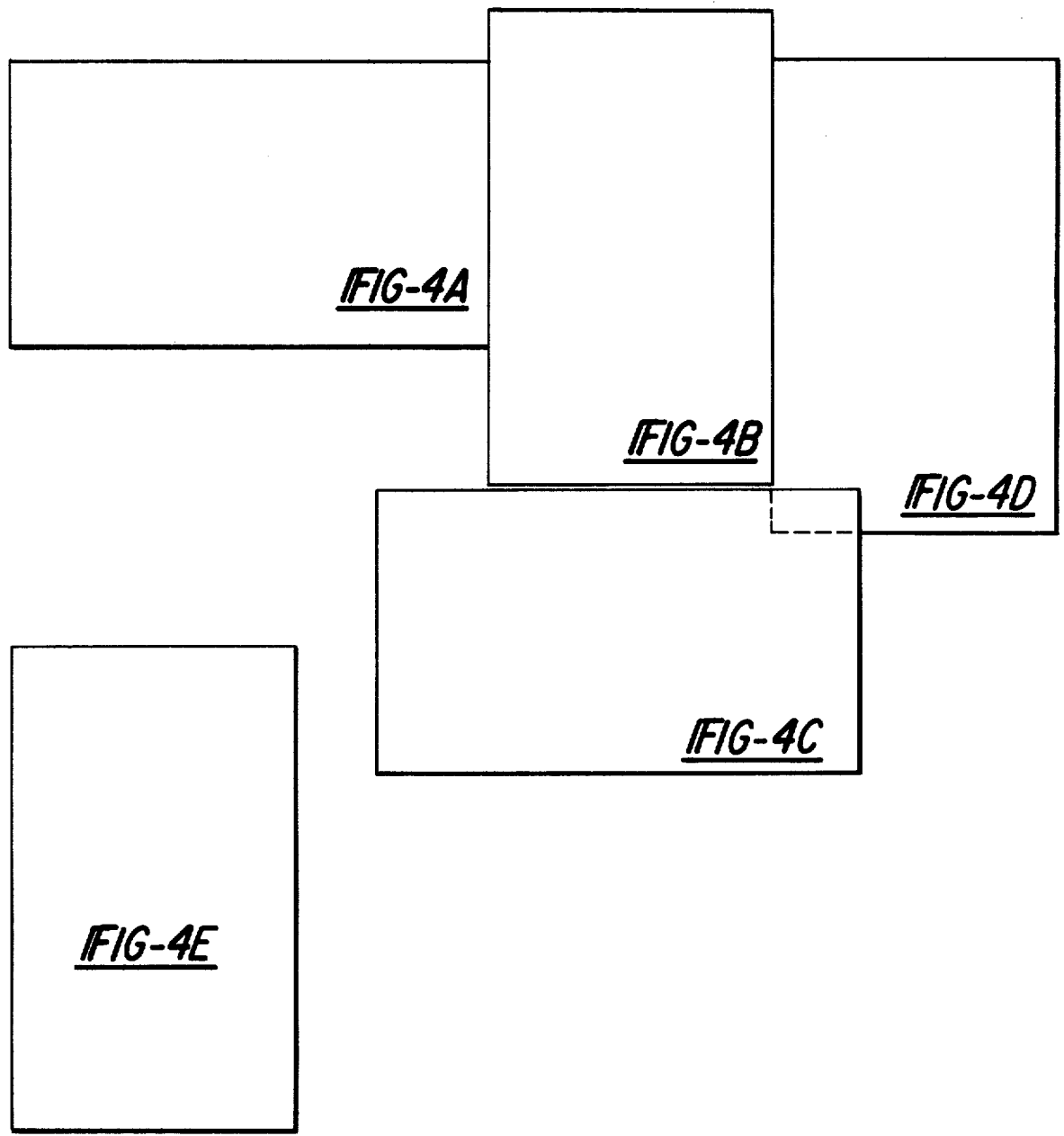
FIG. 4(A-E) is a detailed schematic diagram of the interface system shown in FIG. 3, with FIG. 4 showing the interconnection of FIGS. 4A-4E.
Figure 4A:
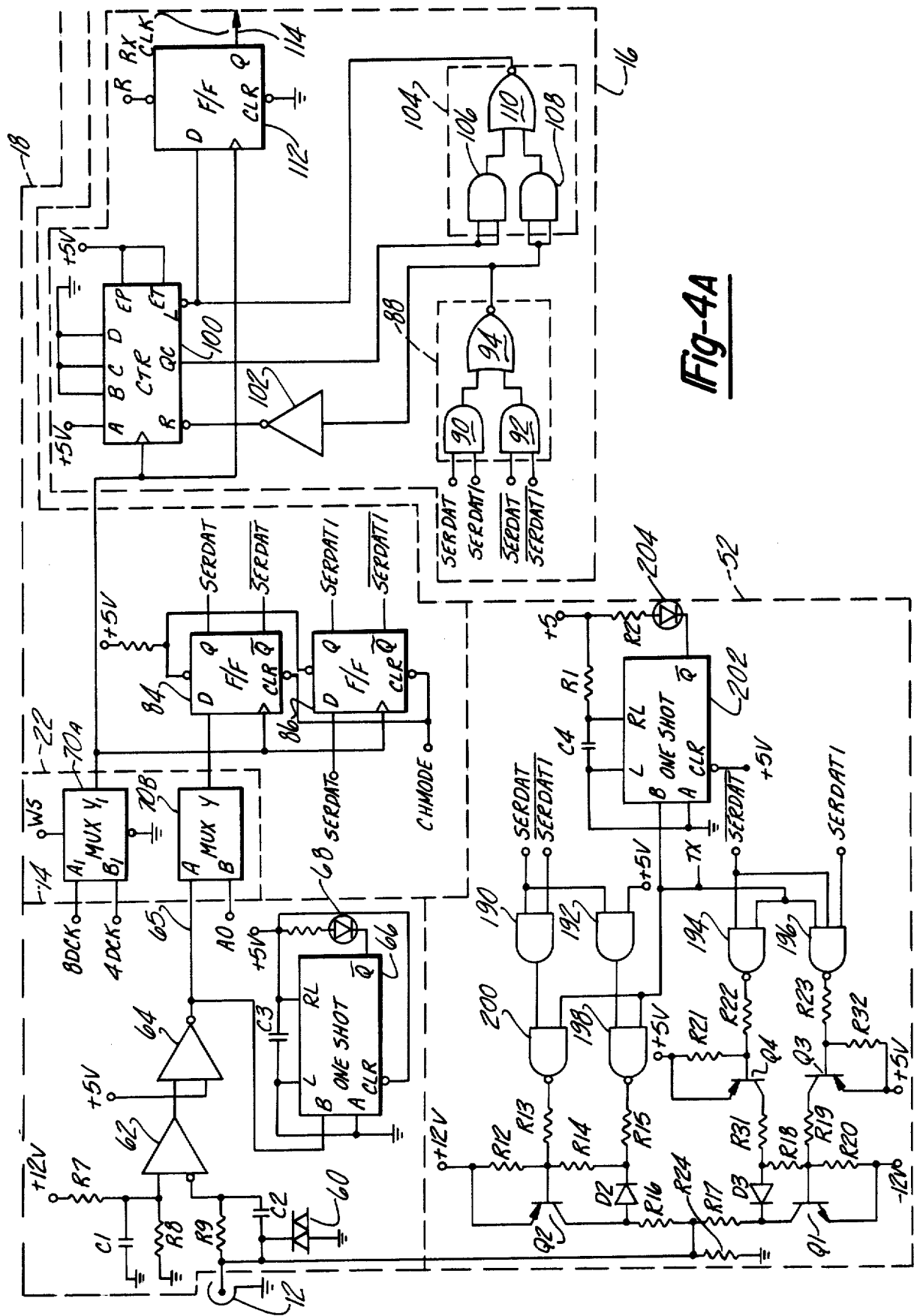

Turning now to FIG. 4A, the receiver level converter 14 serves to convert the biphase waveform shown in FIG. 1A to TTL level compatible signals as shown in FIGS. 1B and 2. Biphase transmissions received over coax 12 are squared up and converted to TTL levels by a voltage comparator 62 which in the preferred embodiment is a component number LM306. The reference voltage is set at about 15 millivolts such that whenever the biphase signal on the coax 12 is above the reference voltage the comparator 62 will provide an output. The output of comparator 62 is inverted by inverter 64 to provide levels of about +4.0 volts for every positive biphase waveform and zero volts for every negative biphase waveform. A one shot multivibrator 66 is operative to flash an LED 68 whenever there is a signal being received over coax 12.

A group of multiplexors 70 and 72, multiplexed latch 73, and associated logic gates form mode control logic 22. In the preferred embodiment multiplexors 70A and 70B are on one integrated circuit chip and they are controlled by a single control input. Similarly, multiplexors 72A and 72B (FIG. 4B) are in one integrated circuit chip. The control signals are provided by controller section 34 which places multiplexors 70, 72 and multiplexed latch 73 into a receiver mode whenever interface 10 is not transmitting data. In the receiver mode multiplexor 70A has its A1 input coupled to its Y1 output. The A1 input is coupled to a source of clock signals having a frequency of about eight times the incoming data rate. In this embodiment, the incoming data rate is 2.3587 megabits/second. Therefore, the 8DCK signal is 18.867 megahertz providing a sample time of about 53 nanoseconds. The 8DCK signal is derived from a master clock 20 shown in FIG. 4E. Master clock 20 includes a crystal 76 oscillating at approximately the data clock rate of 18.867 megahertz which is divided down by counter 78 into the desired subfrequencies. Flip flops 80 and 82 along with their associated components provide other timing functions used by controller 34.

Returning now to FIG. 4A, the output of multiplexor 70A is coupled to the clock input of flip flops 84 and 86. The D input of flip flop 84 is coupled to the incoming data through multiplexor 70B which has its A input coupled to the Y output during the receiver mode. The Q output of flip flop 84 is labeled as SERDAT and this signal line is coupled to the D input of flip flop 86.

FIG. 5 shows the relative timing of the signals applied to and generated by flip flops 84 and 86 in the receiver mode. It can be seen that the SERDAT signals (FIG. 5B) will generally correspond to the received TTL converted data signals (FIG. 5A) but that SERDAT1 (FIG. 5D) will be delayed from SERDAT by one sample clock time (FIG. 5B), i.e. 53 nanoseconds or ⅛ of the bit time.

The outputs of flip flops 84 and 86 are connected into AND-OR-INVERT gating logic 88 consisting of AND gates 90, 92 and NOR gate 94. This combustion of logic elements performs the function of a high spaced comparator. The output of gating logic 88 will thus provide pulses which will occur whenever SERDAT and SERDAT1 are not the same as shown in FIG. 5E. This occurs whenever there is a transition of the received data as can be seen in FIG. 5A which shows the last two bits QD8, QD9 in the line quiesce and the code violation (CV0-CV5) of the header.

The primary object of the receiver clock generator 16 is to provide clock pulses that are in synchronism with the incoming data and which provides exactly only one rising edge occuring at the half-bit data rate when the data is stable. If a transition occured once for every bit time in the incoming data, then the receiver clock could relay solely upon detecting such transitions for generating its clock signals. However, this is not always the case for biphase transmissions using the particular protocol described above. In FIG. 5A it can be seen that there are no regularly occuring transitions for the code violation portion of the header. Additionally, there are no regular occuring transitions where a biphase one is followed by a biphase zero or vice versa. Pursuant to a feature of this invention the receiver clock generator 16 includes provisions for generating the defined clock pulses when there are no such regularly occuring transitions of the incoming data.

In FIG. 4A the output of gating logic 88 is coupled to the reset input of a binary counter 100 through an inverter 102. Counter 102 is wired so as to time out and provide a pulse on its QC output unless it is reset before hand by gating logic 88. In the preferred embodiment counter 100 is a 74LS163 and is clocked by the 8DCK pulses from multiplexor 70A. If counter 100 receives a signal at its reset input (R) it will begin to count at zero and will time out and provide an output pulse on its QC output line after 265 nanoseconds. This is equivalent to one half-bit time (212 nanoseconds) plus a framing error time of 53 nanoseconds. If, however, counter 100 receives a signal only at its load input (L) then it will count from one end time out after 212 nanoseconds.

The operation of counter 100 will become apparent by way of a specific example. Referring to FIG. 5, counter 100 will be reset by the output of gating logic 88 by each transition of the line quiesce portion of the header before it times out and therefore will not provide any output pulses as can be seen in FIG. 5F. However, when the received data (FIG. 5A) reaches the code violation portion there are no such transitions and therefore counter 100 will time out after 265 nanoseconds and provide the first output pulse on its QC output. The QC output is connected to gating logic 104 which acts as an OR gate and effectively combines the pulses derived from logic 88 and those pulses derived from counter 100. The output of gating logic 104 is coupled to the input of flip flop 112 which is clocked out at the 8DCK level to provide on line 114 the receiver clock pulses. Flip flop 112 serves as a digital filter and also acts to delay the combined pulses from gating logic 104 slightly to provide a "front porch" or set up time between transitions of the received data.

In this example, the generation of an output pulse from gating logic 104 will supply a high signal to load input (L) of counter 100. No such signal will be applied to the reset input (R). Therefore, counter 100 will count from one and time out with 212 nanoseconds unless reset by gating logic 88. Since this does not occur during the remaining negative portion of the code violation section of the header, counter 100 will provide a second output pulse after 212 nanoseconds. The transition in the code violation section will be detected by gating logic 88 and therefore simultaneous signals are provided on the counter's reset (via logic 88) and load inputs (via gate 104) such that it will not time out again until after 265 nanoseconds. This occurs in the positive portion of the code violation as shown in FIG. 5F. The counter 100 will time out after 212 nanoseconds in the remaining positive portion of the code violation.

This process continues to occur throughout the time in which interface 10 is receiving data. It should be noted that the counter 100 provides pulses for the receiver clock when the incoming data changes from a logical zero to a logical one and vice versa as well. Thus, it can be appreciated that the receiver clock generator 16 of the present invention provides clock pulses in synchronism with the incoming data and will provide rising edges that occur consistently within the alotted half-bit times when the received data is stable. By allowing for a framing error during the first generation of the pulse from counter 100 compensation is provided for any differences between the master clock rate and the control unit clock. While the clock pulses do not occur at exactly timed intervals they will always provide rising edges when the received data is stable.

D. BI-DIRECTIONAL BIPHASE SERIAL/TTL PARALLEL LOGIC TRANSLATOR (RECEIVER MODE)

Figure 4B:
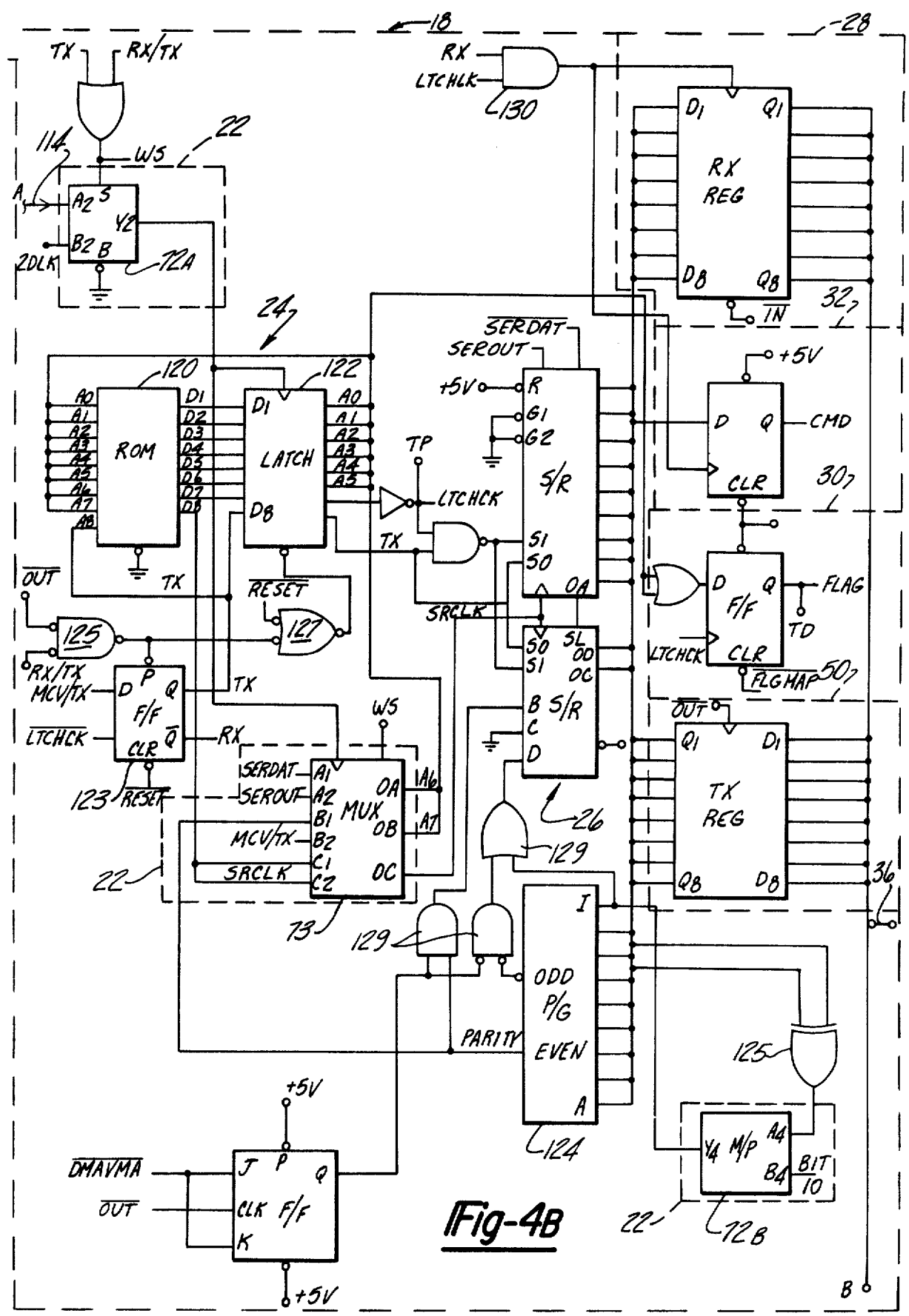
Figure 4C:
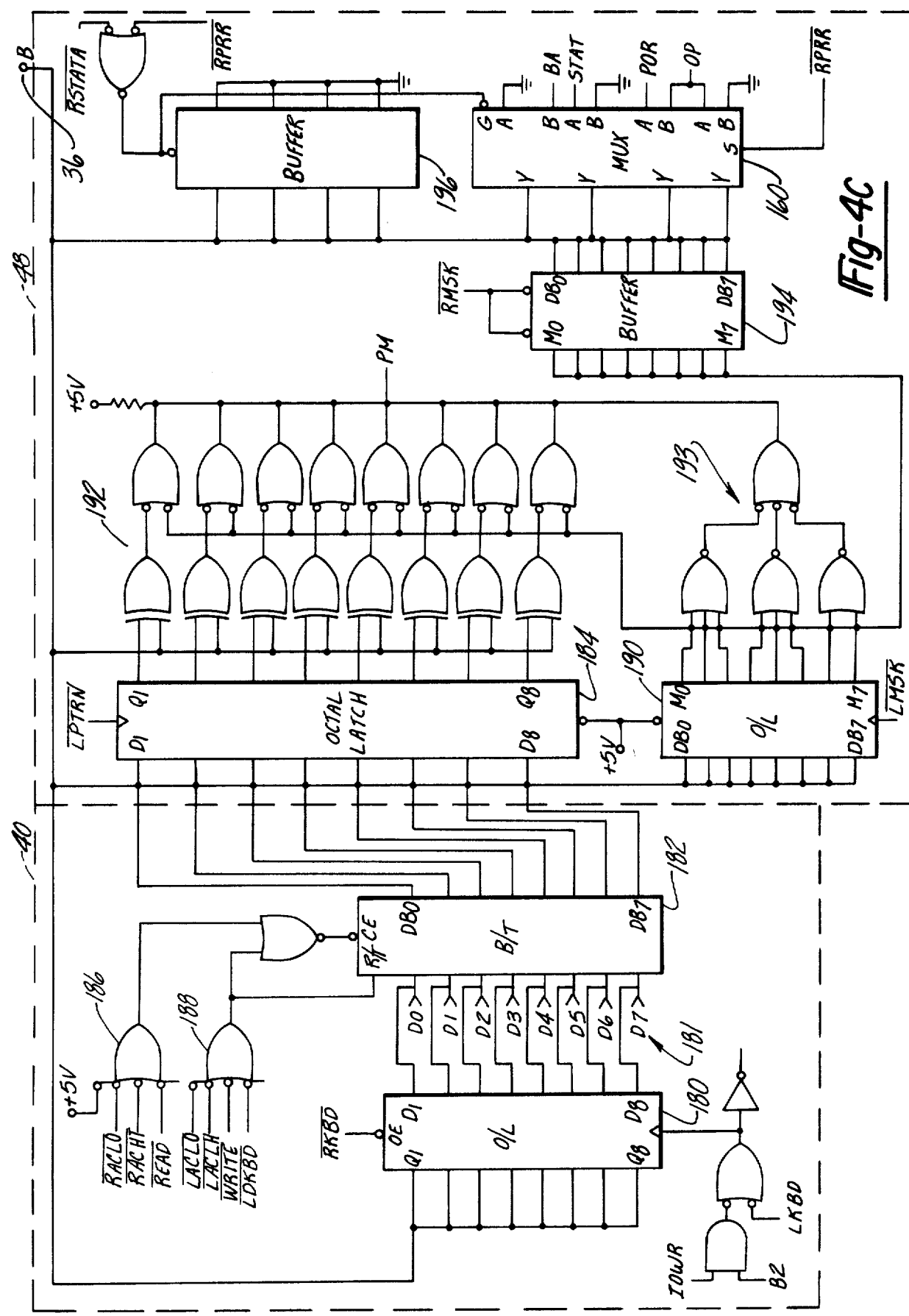

Turning to FIG. 4B, the receiver clock signals on line 114 are coupled though multiplexor 72A in the receiver mode. The receiver clock signals are used to clock ROM-latch 24 and multiplexed latch 73. The word select (WS) signal applied to multiplexed latch 73 during the receiver mode serves to couple SERDAT to its 0A output, a parity check signal PARITY to its 0B output, and a shift register clock signal SRCLK to the 0C output, the latter to be more fully described herein.

ROM-latch 24 consists of a read only memory 120 having address lines A0-A8 and data output lines D1-D8. In the preferred embodiment ROM 120 is a TBP28S42 memory. A subset of the output lines D1-D8 are coupled to the data inputs of an eight-bit latch 122. A subset of the output lines of latch 122 are fed back to the address inputs of ROM 120. In this embodiment the first five of the latch's output lines form address inputs A0-A5 for addressing ROM 120. The other addressing signals come from multiplexed latch 73 (A6, A7) and a mode select signal TX (A8).

The purpose of ROM-latch 24 in the receiver mode is to first determine whether the correct header sequence has been received and, if so, to cooperate with shift registor 26 to translate each biphase serial data word into a TTL parallel word and then transfer the parallel data word from shift register 26 into receiver register 28 if there is correct parity. ROM-latch 24 steps through a sequence of addressing operations at the half bit transmission rate supplied by clock signals over line 114. Since the signal level of SERDAT is a direct function of the biphase transmission (FIG. 5) and SERDAT is used as the A6 addressing input for ROM 120, the data read from ROM 120 is a direct function of the received biphase transmission.

ROM 120 is programmed in a table-like fashion such that it will progress through the table and reach a given memory location assuming that the correct header sequence has detected. If so, data line D8 will provide shift register clock signals SRCLK timed so that meaningful data following the header sequence may be clocked into the shift register 26. If the appropriate header sequence has not been detected or an invalid data bit is received, then ROM-latch 24 will effectively reset itself to the beginning position in the table. Each subsequent word of biphase serial data having been converted to TTL parallel and loaded into shift register 26 will be checked for good parity. The parity signal from parity generator 124 provides the A7 addressing input to ROM 120. Since the last bit of the data word will be the parity bit, if A6 equals A7 then good parity is detected. If parity is good the ROM-latch 24 will generate a latch clock signal LTCHCK on data line D7. The generation of a latch clock signal LTCHCK causes the contents of the shift register 26 to be latched into the receiver register 28. This is accomplished by generating an enabling signal from AND gate 130 when LTCHCK and a receiver signal RX is high (indicating that interface 10 is in receive mode). Additionally, the output of AND gate 130 serves to set flag flip flop 30.

A state diagram for the operational sequence of translator 18 is shown in FIG. 6. It is important to note that each step is occurring at twice the data rate, i.e. the addressing and reading operation of ROM-latch 24 occurs once for each half-bit time of the biphase data. By doing so it is possible to determine whether the voltage level of the incoming data corresponds with the correct header sequence voltage level for that time period. Additionally, by sampling the valid data at the half-bit rate it is possible to convert each bit of the biphase data (having a mid-bit transition) into a corresponding TTL bit having no such mid-bit transition. For purposes of this invention this process will be called biphase to TTL translation and should be contrasted to the mere voltage level conversion carried out by the voltage level converter 14. It can be appreciated that mere voltage level conversion will not transform biphase data bits into corresponding meaningful TTL data bits.

Figure 6A:
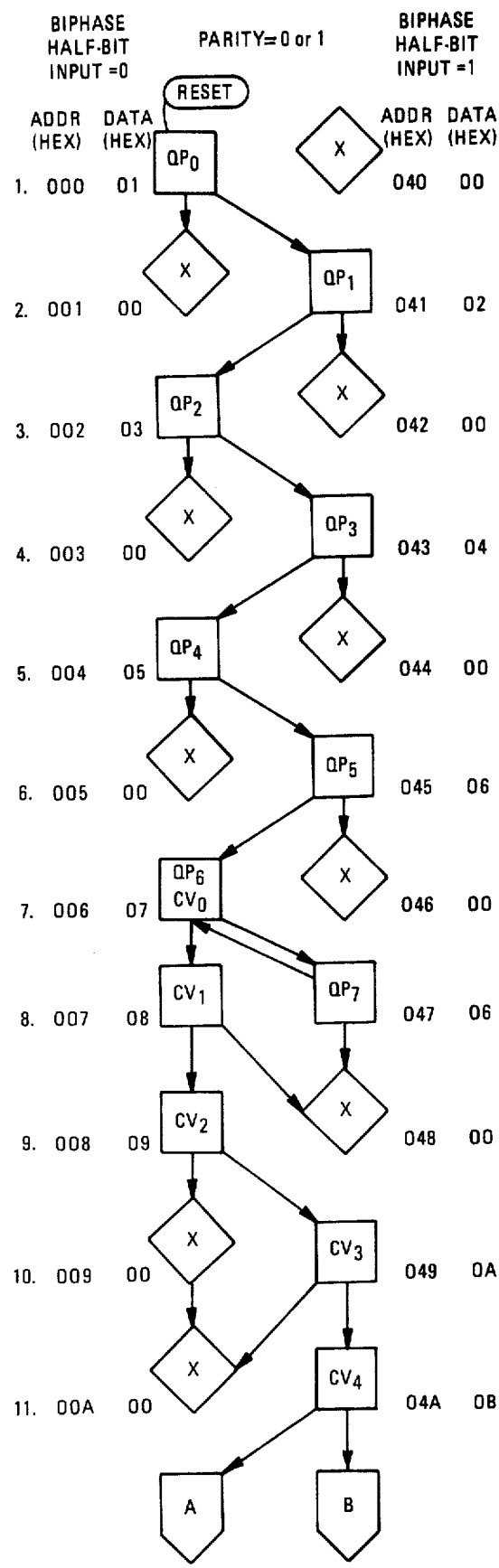
FIG. 6(A-E) is a state diagram showing the sequence of operational steps of the ROM-latch portion of the interface system in the receiver mode.
Figure 6B:
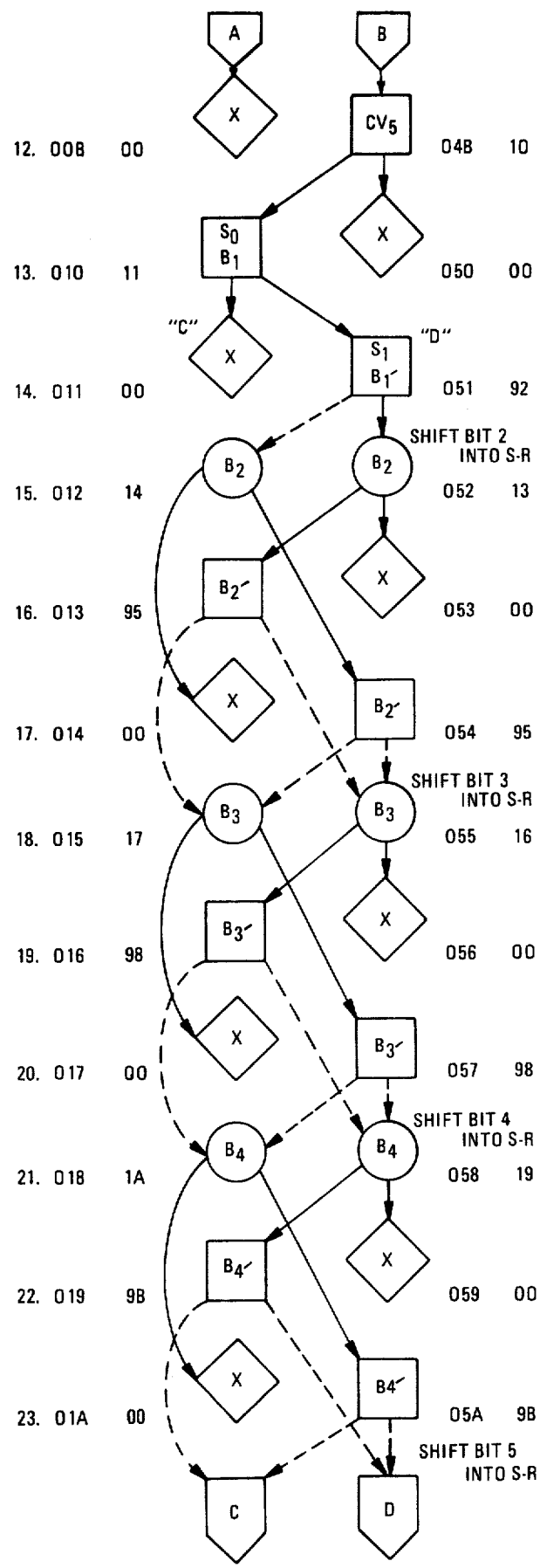
Figure 6C:
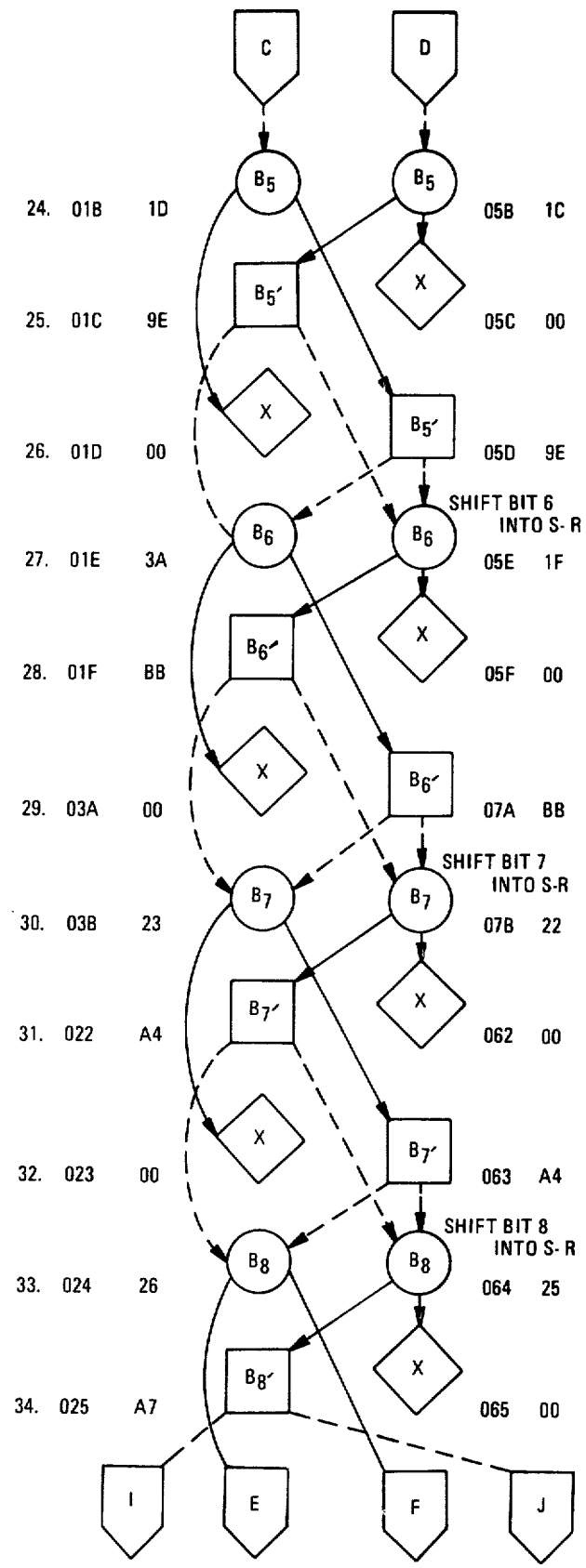
Figure 6D:
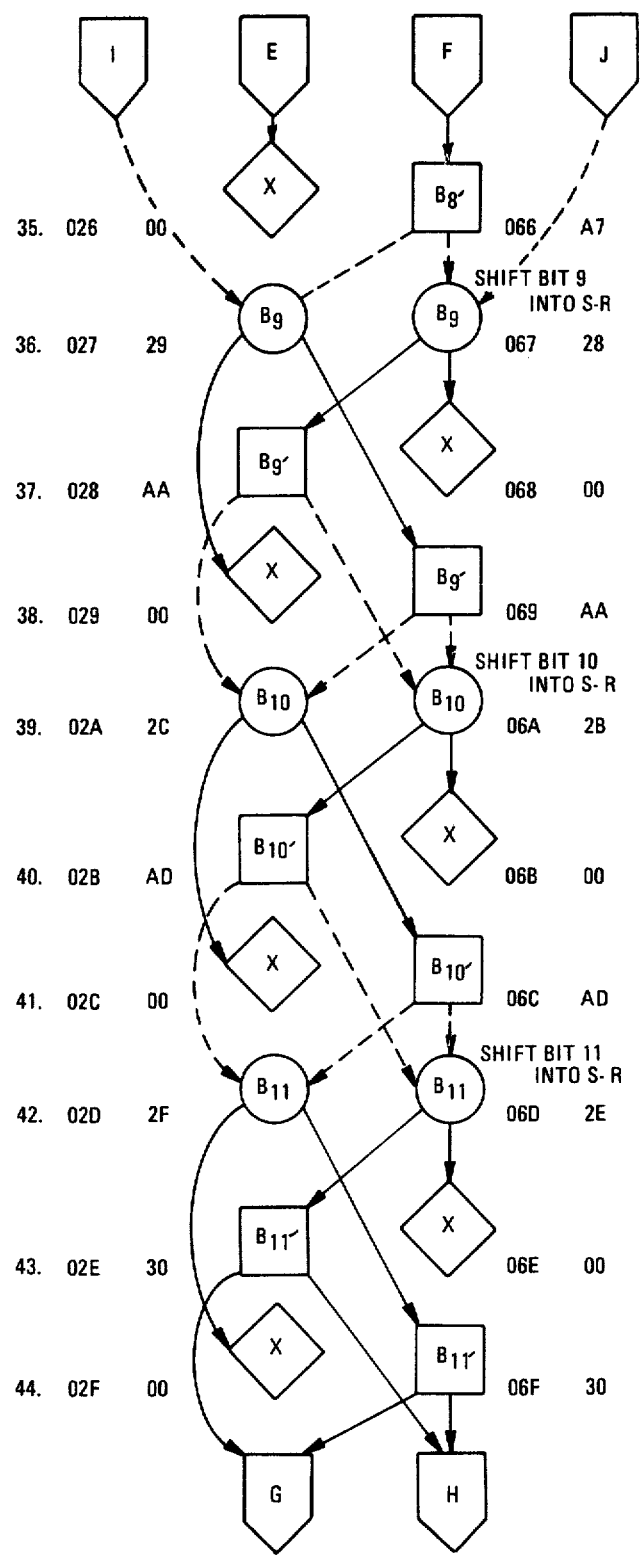

Turning then to FIG. 6A, latch 122 is cleared when interface 10 is placed in the receive mode thereby providing a zero address for ROM 120. The ROM-latch 24 will be looking for a biphase half bit input of a zero level since the header begins with a low voltage level. If SERDAT is low at this half bit time then address line A6 will also be low along with the remaining address inputs. In FIG. 6 the address inputs and data outputs of ROM 120 are shown in hexadecimal notation. In step 1, if SERDAT is low then ROM 120 will provide a data output of 01 which data will be fed back to input lines A0-A5 through latch 122. On the other hand, if SERDAT was high then the address to ROM 120 would be 040 and the contents at this location would generate a 00 at the data output thereby returning the sequence to its beginning step. This is noted by the X in the state diagram. In our example since QP0 (representing the first half bit P0 in the line quiesce portion of the header) is correct, the ROM-latch continues its sequence. If SERDAT is high at the next half-bit time then A6 will be at a logical 1 level and when combined with the previous address signals on lines A0-A5 will result in an address of 041. ROM will output data of 02 in response thereto noting the detection of the second half-bit QP1. If SERDAT is low (as it should be for QP2) for the next half-bit sampling time the address to ROM 120 will remain at 002 and the checking sequence will continue to progress. If SERDAT was incorrectly at a high level then the address generated would be 042 and the ROM will output data of 00 returning it to the beginning of the table. This sequence progresses throughout the header and includes a check for the code violation (CV) and sync bit (S) as well.

If the sequence progresses to step 14 in the state diagram, ROM 120 will output a data value of hexadecimal 92 to thereby activate data line D8 which serves as the shift register clock signal SRCLK. Note that the shift register clock signal SRCLK is not generated for the first bit in the 12 bit data word since this represents the sync bit. The following 10 bits (bits 2-11) may contain useful information whereas the last bit, bit 12, is a parity bit. Ordinarily, only bits 2-9 are used to control the peripheral. Bit 10 is normally meaningless while bit 11 defines bits 2-9 as being a command or data. Command flip flop 32 in the preferred embodiment is part of receiver register 28 which is loaded by bit 11 to indicate the definition of bits 2-9 as commands or data. Bits 2-11 are used to generate parity which is compared with the parity bit, bit 12, for parity checking.

The ROM-latch 24 checks for illegal patterns in each of the data bits. For example, if SERDAT is low or high for more than two half-bit times then the ROM-latch will detect that this does not represent valid data and will return to its beginning sequence.

The shift register clock signal SRCLK provides a rising edge to shift register 26 which occurs during the first half bit of the bit time. Since this signal is fed through multiplexed latch 73 the ROM-latch 24 must generate it one receiver clock time beforehand so that the rising edge will occur when the first half of the biphase bit is presented to shift register 26. Referring to the state diagram SRCLK is generated when ROM-latch generates a data value of such magnitude that the highest order data line D8 goes high, i.e. takes data line D8 high. In the preferred embodiment the data value of 92 will generate SRCLK for the first time to clock in the first bit B1 of the data word. An inverted version of the biphase data is provided by $\overline{\text{SERDAT}}$ which is connected to the serial input of shift register 26. Thus $\overline{\text{SERDAT}}$ will be high during the first half-bit time for a biphase one and a SRCLK occurring at this time will cause a "normal" logical one to be loaded into shift register 26. Conversely, for a biphase zero $\overline{\text{SERDAT}}$ will be low during the first half bit time and therefore a logical zero will be loaded into shift register 26.

The loading of the shift register 26 is shown in the state diagram of FIGS. 6A-6D in the steps numbered 13-44. In the state diagram the symbols are defined as follows:

$B_N$ means the first half of a biphase bit in a data word;

$B_N'$ means the second half of a biphase bit in a data word;

the circles means that a transition of either a logical one or zero is permissible from this state;

the squares means that there is only one valid transition permissible from this state;

the diamonds mean a bad transition;

the solid arrows means a transition to/from a state;

the dotted arrows mean a data bit is loaded into shift register 26 during this transition; and the arrows with spaced circles mean data in shift register 26 is transferred to receiver register 28 during this transition.

Parity generator 124 is a conventional device which provides an output PARITY which is a function of the sum of the bits in shift register 26. The output of parity generator 124 is coupled through multiplexed latch 73 to provide the A7 address input to ROM 120. Exclusive OR gate 125 coupled through multiplexor 125 conviently converts a conventional nine-bit chip into a ten-bit parity checker. Only 10 bits need to be checked since the sync bit is always a logical one and the twelfth bit is the parity bit to be tested. ROM-latch 24 is programmed in a table fashion (see, in particular FIG. 6E) such that it will provide a data output having a sufficient order of magnitude to make data line D7 go high when the signal PARITY on A7 and the last bit of the data word on A6 are the same. The high on data line D7 serves as the latch clock signal LTCHCK which operates to latch 8 bits of the parallel data from shift register 26 into receiver register 28.

Figure 6E:
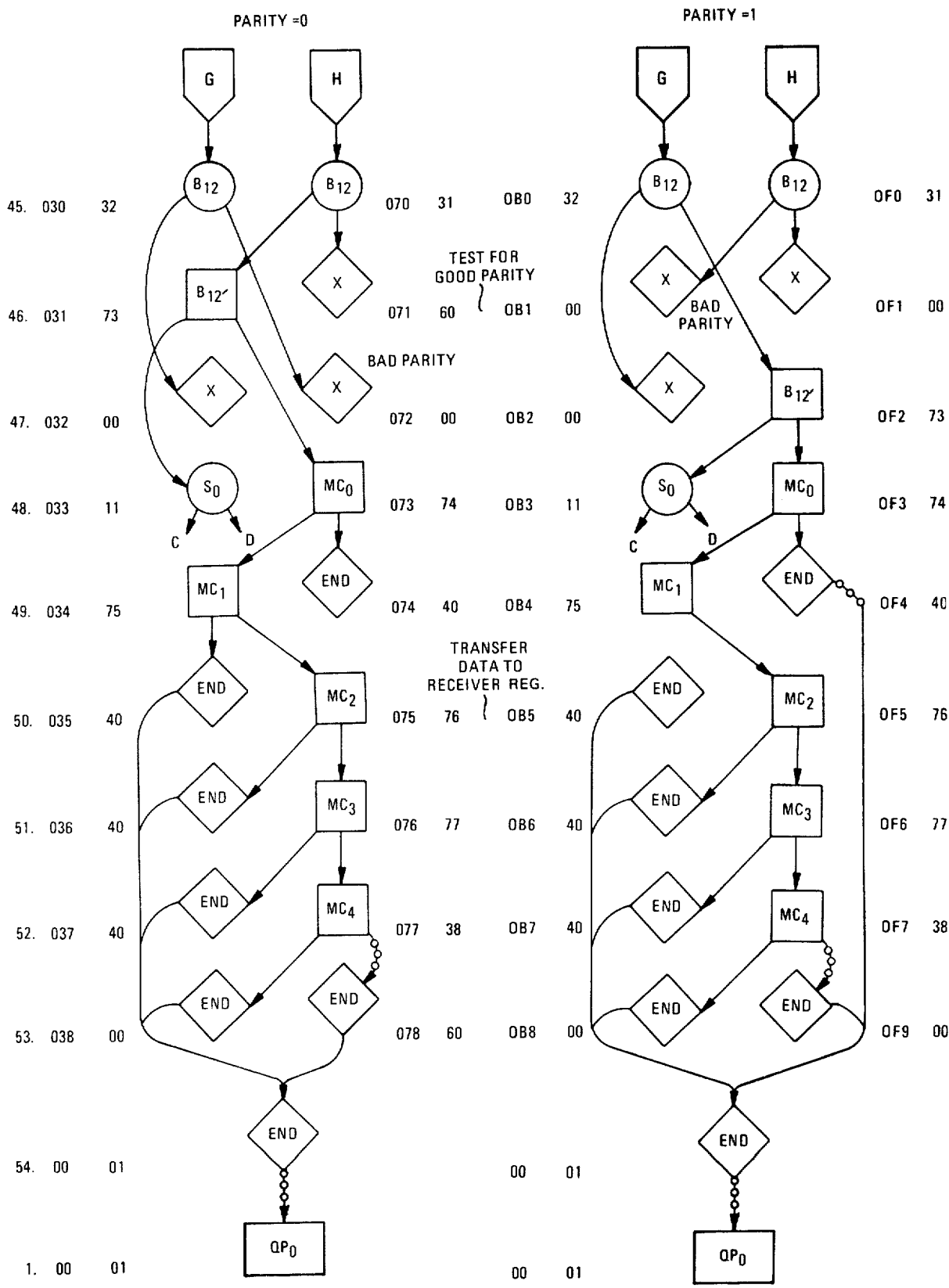
Figure 7A:
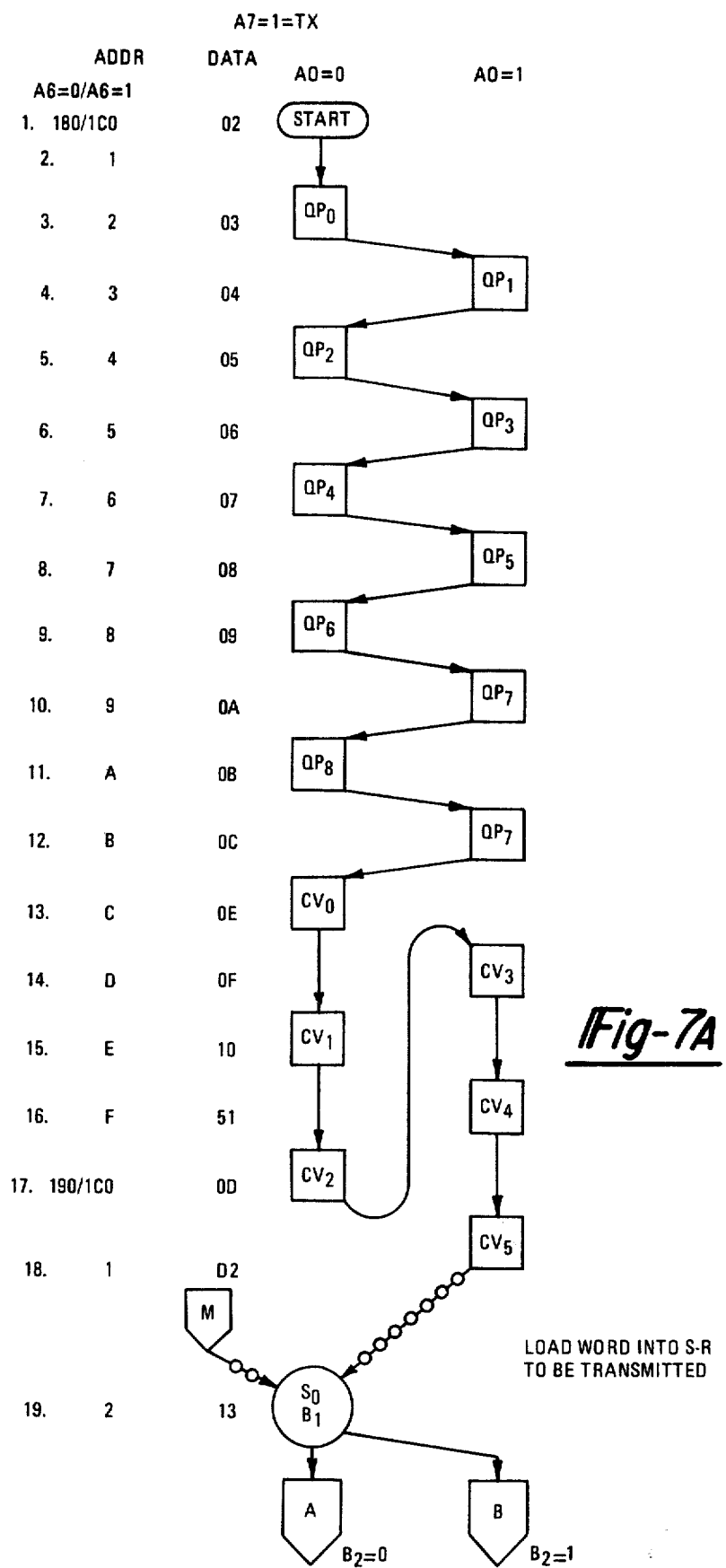
FIG. 7(A-F) is a state diagram showing the sequence of operational steps of the ROM-latch in the transmitter mode.
Figure 7B:
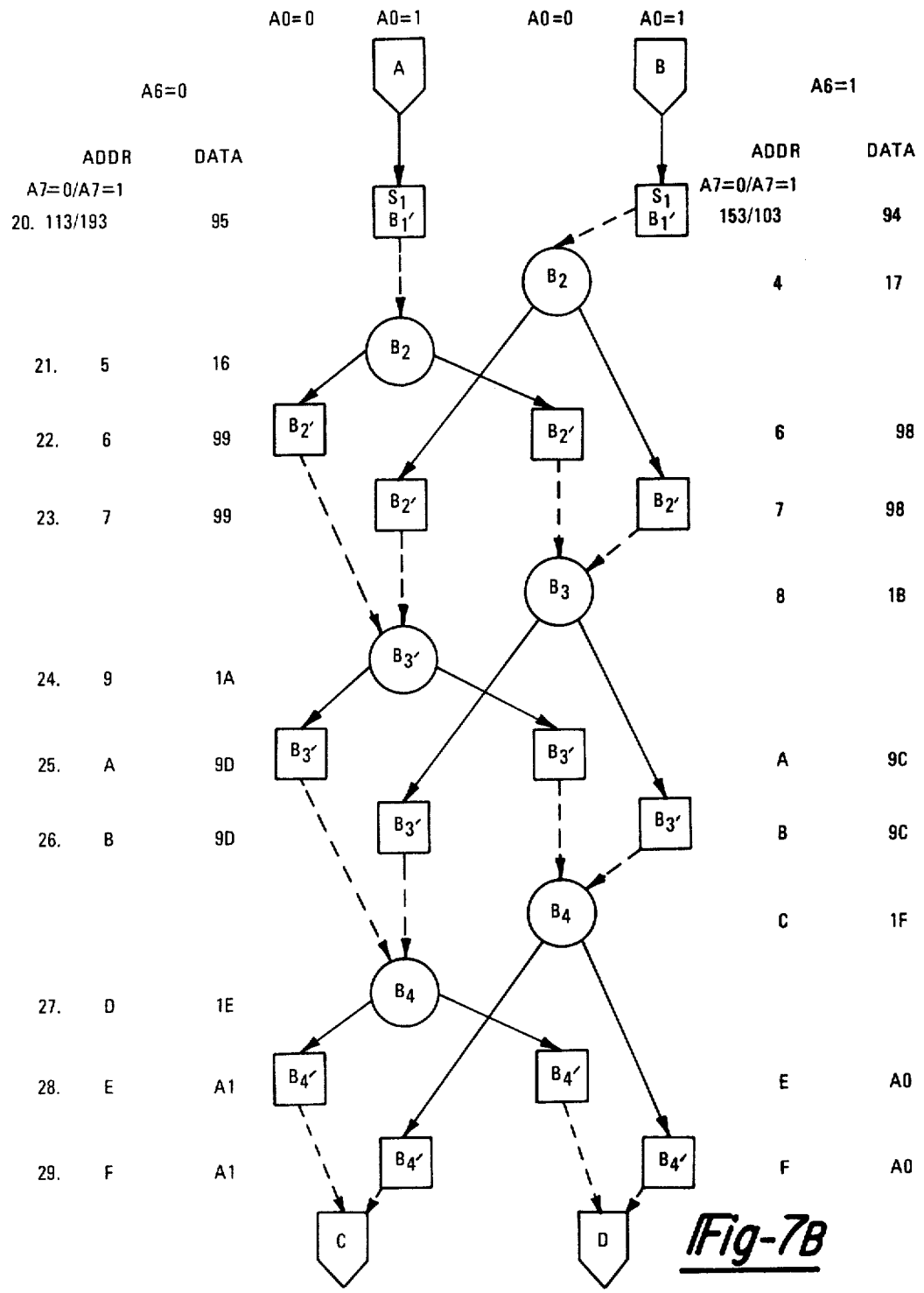
Figure 7C:
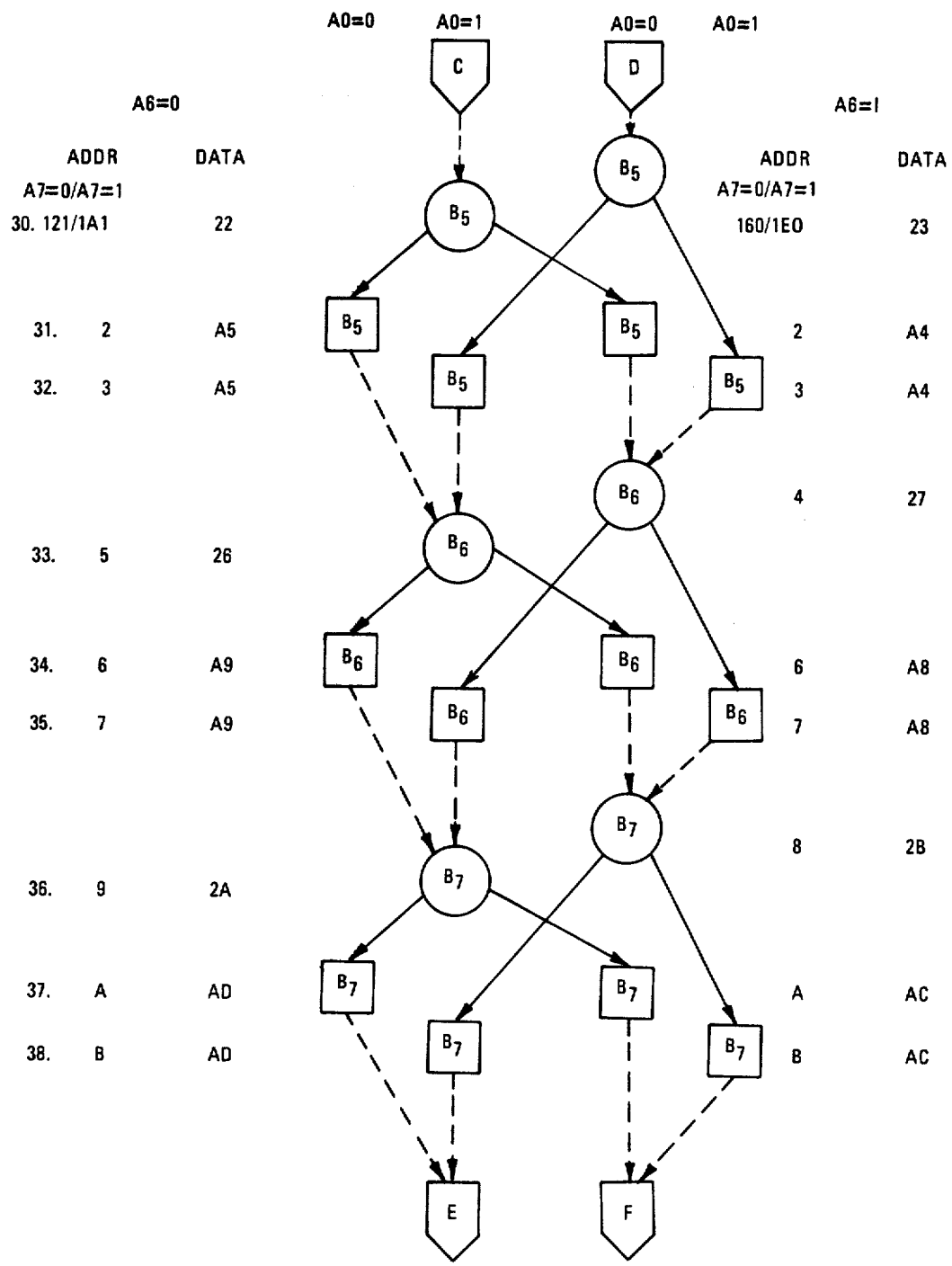
Figure 7D:
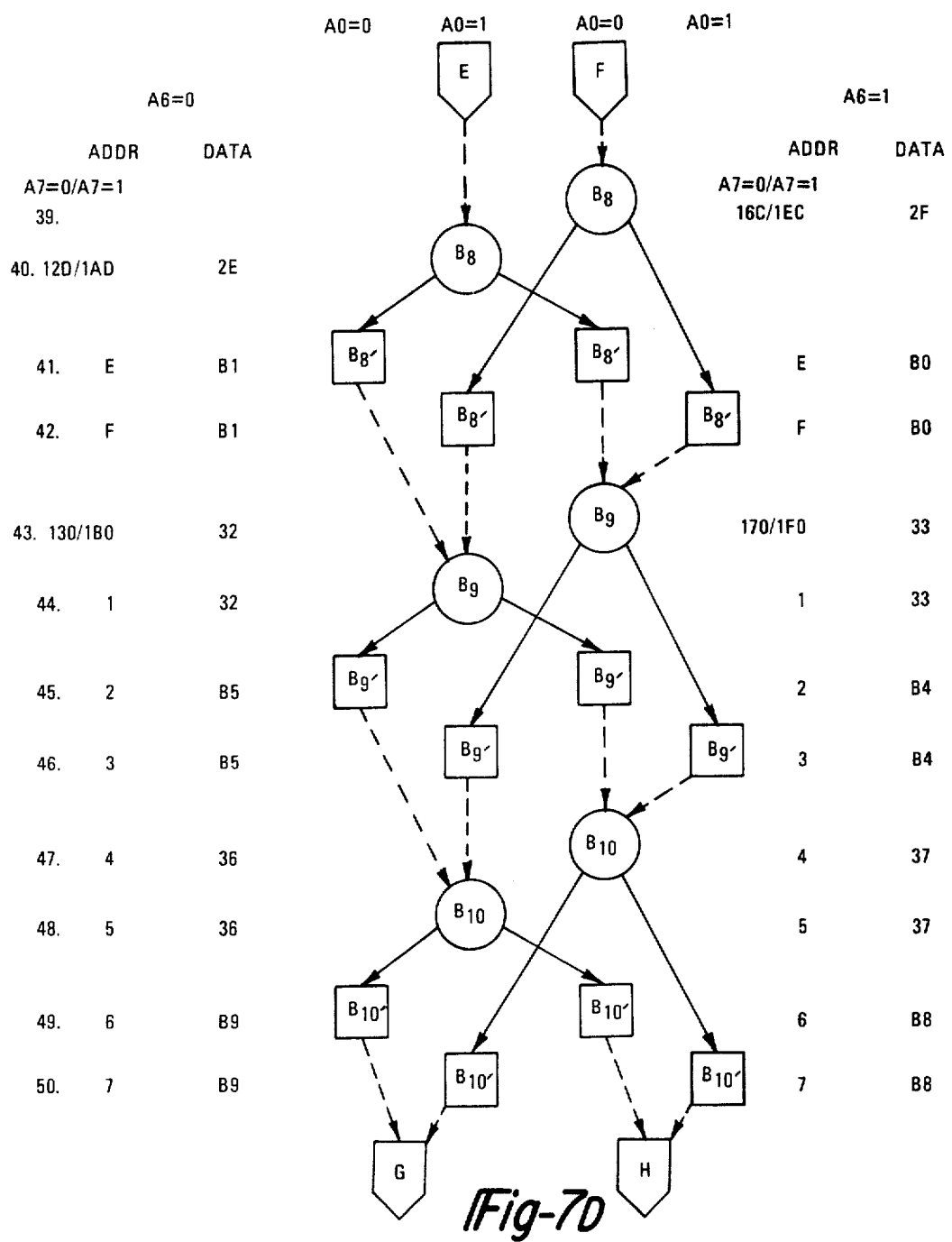
Figure 7E:
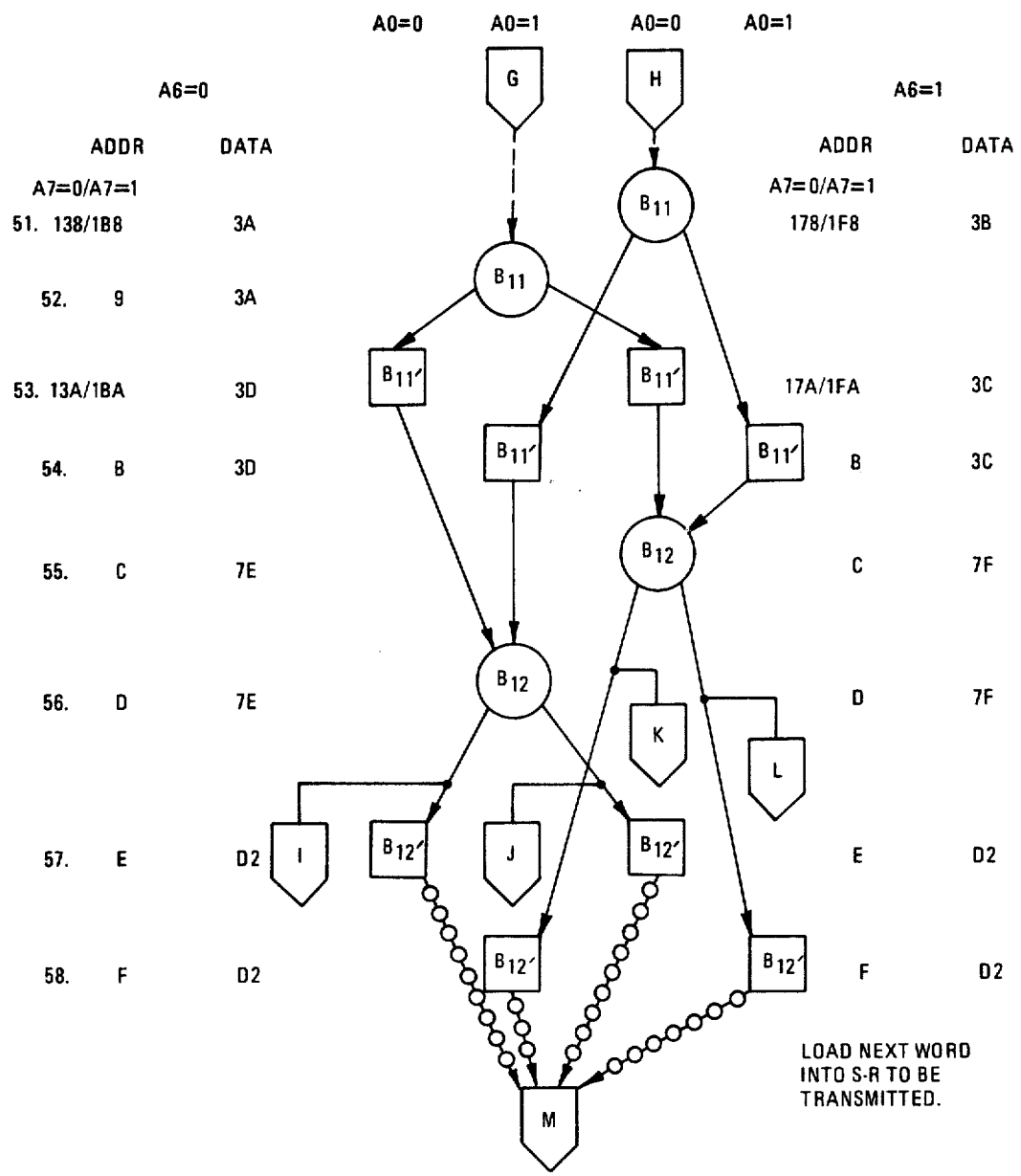
Figure 7F:
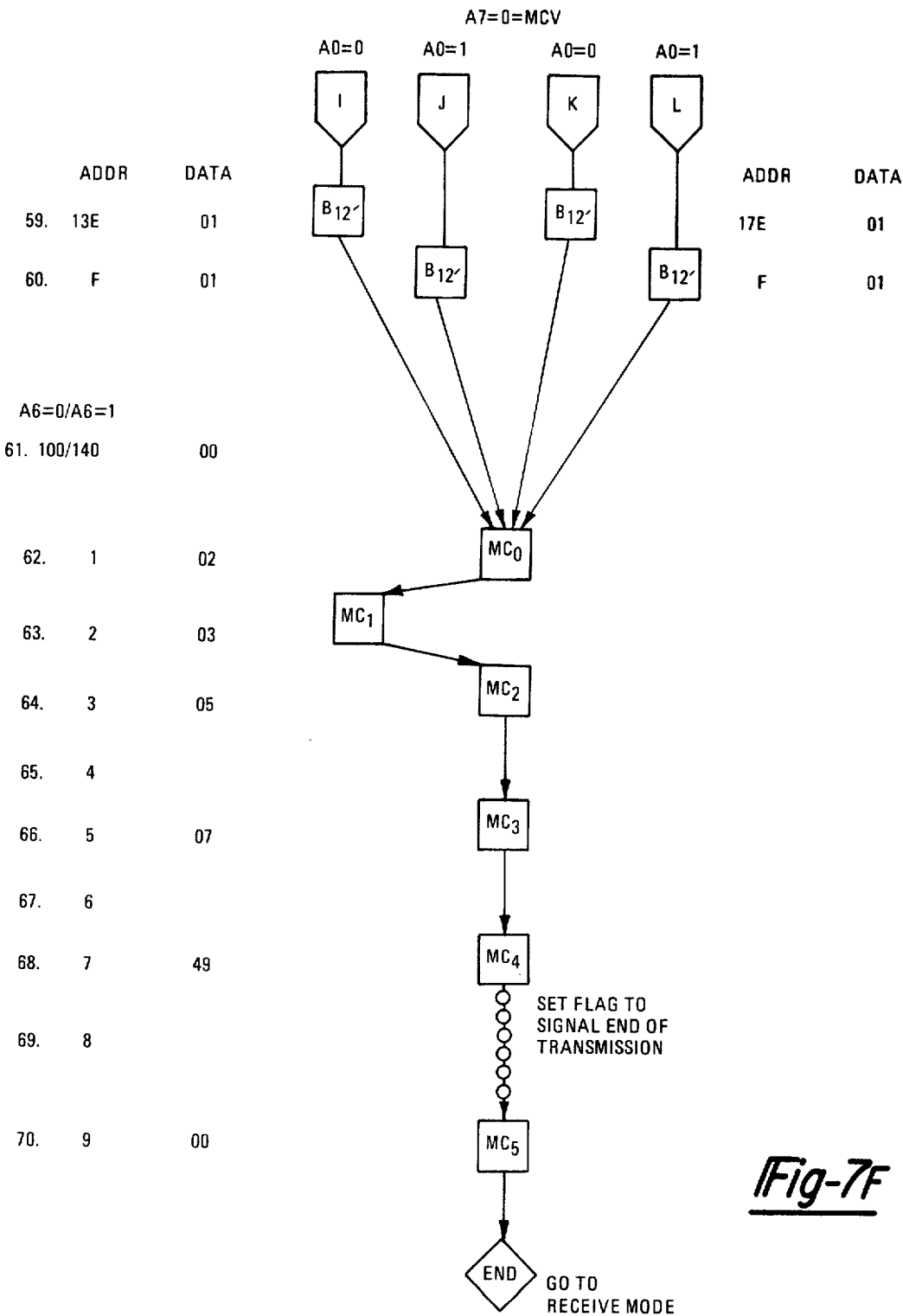

FIG. 6E illustrates two alternative paths of sequencing steps for ROM-latch 24 depending whether the parity bit (A7) is 0 or 1. If PARITY equals 0 then ROM-latch 24 will check for a high to low transition (biphase 0) for bit 12 as shown in steps 45-46. If so, there is good parity. Otherwise, the ROM latch is reset. Similarly, if PARITY equals 1, then ROM-latch 24 checks checks for a low to high transition (biphase 1) for bit 12 as shown in steps 45-47 to determine if there is good parity; if not, ROM-latch 24 will be reset.

The detection of most of the ending sequence or mini-code violation MC1-MC4 will reset the ROM-latch 24 to begin looking for the first bit QP0 of the line quiesce of the next data transmission. If two data words are transmitted back to back, then ROM-latch 24 will detect the sync bit (SO) of the next word (step 48) and perform the sequencing operations beginning with step 14 to check for valid data, etc., as described above.

E. Control

Once the data word has been latched into receiver rgister 28 it may be conventionally processed. The information in register 28 and flip flops 30 and 32 will be in a format that can be used by conventional microprocessing and logic devices using parallel TTL formats since the biphase data transmission has already been voltage level converted and translated into the appropriate format. Consequently, various techniques for using the thus converted and translated data can be employed.

In the preferred embodiment, controller 35 employs a bit slice sequencer 140 to carry out many of the high-speed functions relating to transmission protocol. For example, it responds to commands from the control unit to write, read or clear particular data from memory 38. It also responds to commands from the control unit to poll certain status registers. Controller 34 is responsible for loading the appropriate data back into translator 18 for transmission to the control unit over coax 12.

Microprocessor 42, on the other hand, is responsible for carrying out the particular operations relating to controlling the peripheral unit. If the peripheral unit is a printer, for example, the microprocessor would serve to convert character information supplied by the control unit into information usable by the printer. It can be appreciated that the microprocessor 42 can be programmed to perform a variety of functions necessary for the proper operation of the particular peripheral unit to which interface 10 is attached. Most obviously this can be accomplished by changing the program in microprocessor 42.

Figure 4D:
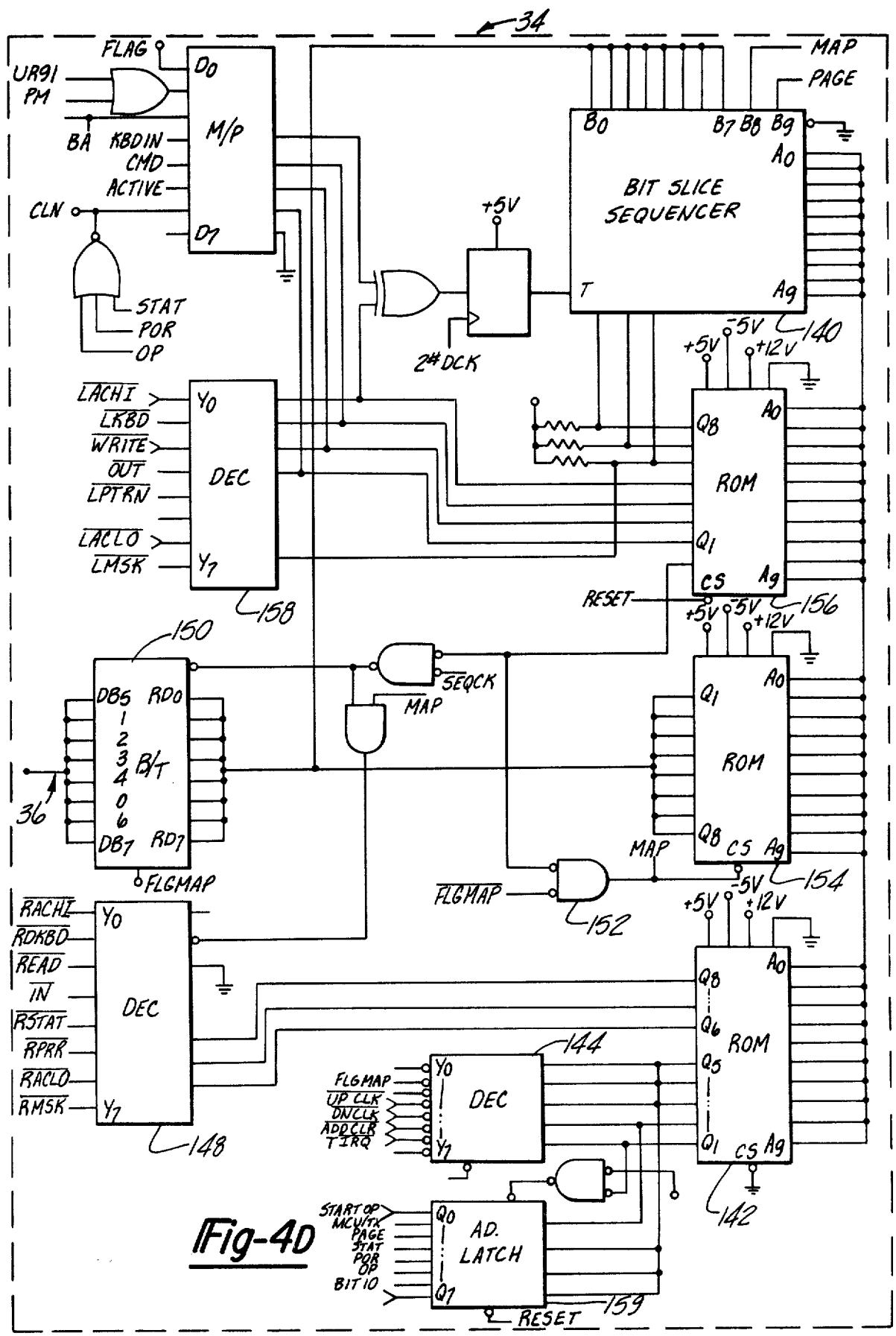
Figure 4E:
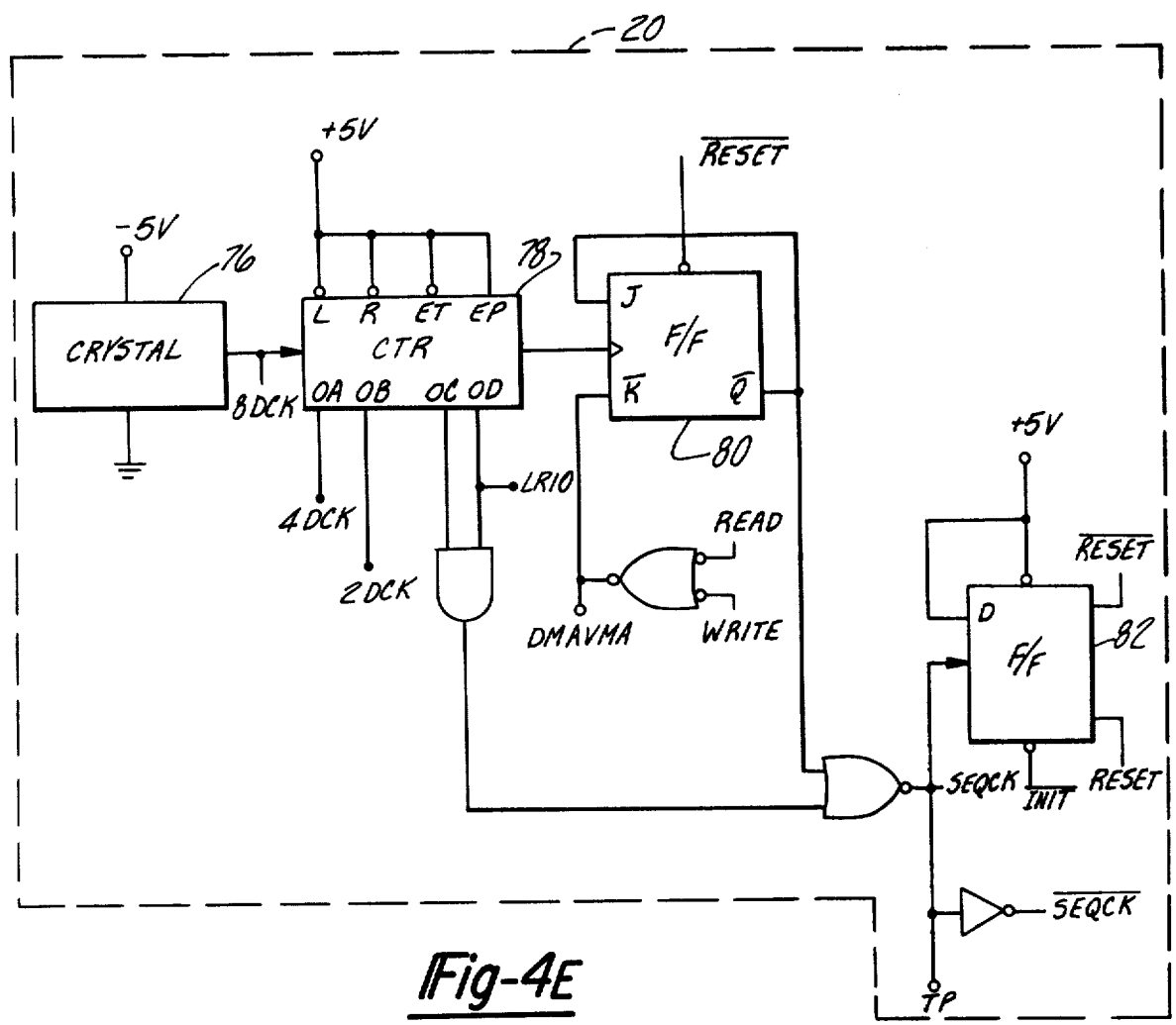

Referring specifically to FIG. 4D, controller 34 communicates with translator 18 over bus 36. In the preferred embodiment bit slice sequencer 140 is a Signetics 8×02. It is conditioned to test for the setting of the flag flip flop 30 indicating that there is data in the receiver register 28. If so, sequencer 140 provides outputs to ROM 142 which supplies appropriate output signals to decoder 148 which generates a flag map FLGMAP signal which clears flip flop 30. This permits the translator 18 to begin looking for new information. Now the controller must process the information in receiver register 28.

If the command flip flop 32 is set then sequencer 140 causes ROM 142 to provide signals on its most significant bit lines such that decoder 148 will generate an IN signal. The FLGMAP signal conditions a bi-directional transceiver 150 to permit data flow from bus 36 into the controller 34, i.e. left to right data flow. The IN signal causes the output of receiver register 28 to dump its contents onto the bus 36 which is used by sequencer 140 as a branch address as conditioned by the signal generated by logic 152. The MAP signal also disables the output of ROM 154 to prevent any bus conflicts. The data from receiver register 28 is thus used as address inputs to sequencer 140 which includes a map table containing an appropriate command subroutine.

Assume that the control unit has asserted a poll command in which the contents of a status register must be transmitted back to the control unit. In response to the command the bit slice sequencer 140 provides appropriate outputs in response to this command such that the ROM's 142, 154 and 156, as well as their associated logic, provide sufficient control signals to carry out the command. In this embodiment decoder 148 serves as a source decoder in that it defines which storage device will assert its data on the bus. Decoder 158 serves as a destination decoder in that it determines where the data is going to go. In the case of a poll command, decoder 148 generates a Read Poll Response Register signal RPRR which enables multiplexor 160 (FIG. 4C) and buffer 196 to place its contents on bus 36. Decoder 158 generates an $\overline{OUT}$ signal which is coupled to the clock input of transmitter register 50 (FIG. 4B) which is parallel loaded with the bus contents. Thus, data is ready for transmission to control unit as will be described later herein.

FIG. 4C shows the details of the control logic 48 and direct memory access circuitry 40. Briefly, direct memory access memory circuitry 40 is connected by way of a bi-directional data bus 181 to microprocessor 42 and memory 38. Information on bus 36 from the control unit is coupled through a bus transceiver 182 to the microprocessor 42 or memory 38. Conversely, information from microprocessor 42 or memory 38 may be communicated back to the control unit depending on the status of transceiver 182 which is controlled by control signals from gates 186, 188. Direct memory access functions are performed in cooperation with gates 186, 188 in a conventional manner.

In addition to the status responses noted above, control logic 48 includes provision for perfoming certain pattern matching functions. Briefly, a coded pattern is placed in pattern register 184 and logic 192 compares it with the data selected by controller 34 and placed on bus 36. This data is typically a byte of data from memory 38. The comparison is performed under the control of the data in mask register 190. When a match is detected logic 192 will generate a signal PM indicating a match. The mask can be read by placing it on bus 36 via buffer 194.

One skilled in the art will appreciate that a wide variety of functions can be performed by this and other control sections.

F. Bi-Directional Biphase Serial/TTL Parallel Logic Translator (Transmitter Mode)

It will be remembered that controller 34 generates the signal $\overline{OUT}$ whenever data is to be loaded into the transmitter register 50. Controller 34 also generates a signal MCV/TX developed at addressable latch 59 when data is to be transmitted. Flip flop 123 thus goes high on its Q output which provides transmit mode signal TX. Gates 125, 127 sense the states of signals $\overline{OUT}$ and TX and operate to clear latch 122 thereby resetting ROM-latch 24 to zero on its data output lines. When signal TX goes high all of the multiplexors of the mode control logic 22 are switched. In FIG. 4B multiplexor 72 thereby provides clock signals at twice the data clock rate (2DCK) to ROM-latch 24. On the other hand, flip flop 70A (FIG. 4A) provides clock signals at four times the data clock rate (4DCK) to flip flops 84 and 86. Additionally, the address line A0 from ROM-latch 24 is connected through multiplexor 70B to the D input of flip flop 84. Multiplexed latch 73 is also conditioned such that SEROUT (from shift register 26) is connected to the 0A output; the signal MCV/TX is connected to the 0B output, with the shift register clock signal SRCLK remaining the same.

The first function of the ROM-latch 24 in the transmitter mode is to generate the header sequence prior to transmission of the data in transmitter register 50. After the header sequence is generated then ROM-latch 24 serves to translate the parallel TTL data in register 50 into biphase serial format closing with the proper ending sequence. Transmitter level converter 52 then operates to shape the ultimately transmitted waveforms into the above defined biphase waveforms. The ROM-latch 24 transmitter operation can be envisioned as being effectively the reverse of the process used during the receiver mode. FIG. 7 shows the state diagram of the operational sequence for ROM-latch 24 in the transmitter mode. Since the state diagram closely follows the nomenclature and sequence pattern used in FIG. 6, a detailed description will not be necessary for one skilled in the art to appreciate how the ROM-latch 24 works during the transmitter mode. Briefly, ROM-latch 24 steps through its sequence at the half-bit rate to generate on address line A0 the appropriate signal level corresponding to the header sequence, biphase bit patterns, and ending sequence, in that order. It should be understood that line A0 is connected to flip flop 84 during the transmitter mode and therefore the output signals from flip flop 84, 86 are functions of the A0 output from latch 122 of the ROM-latch 24 combination. The outputs from flip flops 84, 86 are used by transmitter level converter level 52 to shape the waveforms of the ultimately transmitted signal as will be discussed later.

Steps numbered 1–18 in FIG. 7 illustrate the generation of the header. After the generation of the sync bit, ROM-latch 24 provides a latch clock signal LTCHCK. The latch clock signal in conjunction with the transmitter mode signal TX serves to reconfigure shift register 26 into a parallel in to serial out mode such that the contents of transmitter register 50 are parallel loaded into it. In the preferred embodiment shift register 26 is formed of a 74LS299 and 74LS194 coupled together. Shift register clock SRCLK signals will also be generated by ROM-latch 24 to serially clock out the parallel data in shift register 26. Thus, the first bit of parallel data will be shifted through shift register 26 and appear at the output line SEROUT. SEROUT is connected through multiplexed latch 73 and appears as address input line A6. ROM-latch 24 through its sequence of steps will generate on line A0 a logical one level followed by a logical zero level when A6 is a zero. If A6 is a logical one the ROM-latch 24 will provide on line A0 as a zero level followed by a logical one level which corresponds to a biphase one. Since ROM-latch 24 is clocked at the half bit rate for biphase transmissions each TTL level bit will be converted to the appropriate biphase format having the previously defined mid-bit transition. This process continues for the remaining bits in the data word. The parity bit is generated by parity generator 124 and loaded into the correct bit position in shift register 26 via logic 129. The steps numbered 19-58 illustrate the sequence of steps taken by ROM-latch 24 to generate the prallel standard data words into serial biphase data words.

The translation process is completed when the ROM-latch 24 generates the ending sequence (steps 59-70) for the transmission. However, if more than one data word is to be translated ROM-latch 24 will loop through steps 19-58 again for each data word before generating the ending sequence. Thus, it can be seen that the ROM-latch is used to translate TTL parallel data having no mid-bit transition into biphase serial data characterized by its unique protocols and with a mid-bit transition for each bit.

G. Transmitter Level Converter

FIG. 4A in block 52 shows the circuit schematic for the transmitter level converter 52. It will be remembered that address line A0 of ROM-latch 24 is fed through multiplexor 70B into the D input of flip flop 84. The Q output of flip flop 84 SERDAT thus corresponds to the serial biphase data to be transmitted although the voltage levels and shape of the waveforms remain TTL compatible. Since SERDAT is fed back to the D input of flip flop 86, the Q output thereof on line SERDAT1 is delayed from SERDAT by one clock time which is four times the data clock rate provided by 4DCK coupled through multiplexor 70A. The purpose of transmitter level converter 52 is to shape the TTL level data into the correct biphase levels and waveform shapes for transmission over coax 12. With reference to FIG. 1 again it can be seen that each transition of the biphase data must be accompanied by a predistortion pulse. During a positive transition the predistortion pulse is at a level of about +1.3 volts and lasts for one quarter of the bit time. The biphase signal level then returns to about +0.8 volts until there is another transition. Conversely, the predistortion pulse is about −1.3 volts for one quarter of the bit time during a negative transition, with the signal level returning to about −0.8 volts until there is another positive going transition.

Pursuant to a feature of this invention, output transistors Q1 and Q2 are energised in an appropriately timed sequence and placed either in their fully saturated mode or forward active regions depending upon the data to be transmitted. Transistor Q1 when in a saturated mode will supply sufficient current to generate the −1.3 volt signal (on a 93Ω coax cable) and when in its forward active region, will supply the −0.8 volt signal. Conversely, transistor Q2 when saturated will generate the +1.3 volt signal and when in its forward active region will supply the +0.8 volt signal. Thus, it can be seen that during a position transition transistor Q2 will be placed in its saturated mode for one quarter of the bit time and in its forward active region until there is a negative going transition. Transistor Q2 will be turned off on a negative going transition and transistor Q1 will be placed in its fully saturated mode during the first quarter of the bit time and, afterwards, placed in its forward active region until there is another positive going transition.

The operation of the voltage level converter 52 will become clear by way of a specific example. With additional reference to FIG. 8, assume that interface 10 needs to transmit two biphase zeroes followed by a biphase one. The A0 line from ROM-latch 24 and thus the flip flop 86 output signal SERDAT will be high for one half bit time followed by a low for one half bit time to define the first TTL biphase zero. For the next half bit time SERDAT will be high and will be followed by a low during the next half bit time to define the second TTL biphase zero. Finally, the biphase one is defined by a low level for its first half-bit time followed by a high level. The control signal TX is high as discussed above. When not transmitting, control signal TX will be low thereby turning off transmitter level converter 52.

During the first quarter of the first bit time SERDAT and $\overline{\text{SERDAT1}}$ will be high thereby turning on AND gate 190 which in turn causes NAND gate 200 to go low. NAND gates 194-200 are open collector devices. When NAND gates 200 goes low transistor Q2 is placed in a fully saturated state such that its collector rises to the +12 volt level of the reference voltage. A voltage divider network comprised of resistors R16 and R24 divide this voltage down to +1.3 volts and couple it to the coax 12.

During the second quarter of the bit time $\overline{\text{SERDAT1}}$ goes low thereby turning off AND gate 190 and causing NAND gate 200 to go high. When the output of AND gate 200 is high transistor Q2 is no longer biased in its saturated mode. During this time period, however, AND gate 192 is high thereby providing a low signal at the output of NAND gate 198. When NAND gate 198 is low, transistor Q2 is placed in its forward active region. The diode D2 coupled between the collector and base of transistor Q2 serves to fix the collector voltage of transistor Q2 to a level which when divided down by divider network R16 and R24 will provide a +0.8 volt output. Diode D1 converts this linear amplifier configuration into a discrete two level amplifier. Accordingly, the first half-bit of the biphase zero has been generated in which the predistortion pulse occurs during the first quarter of the bit time.

During the third quarter of the bit time SERDAT goes low thereby deactivating AND gate 192 and NAND gate 198 which turns off transistor Q2. However, $\overline{\text{SERDAT1}}$ and $\overline{\text{SERDAT}}$ are high during this time period thereby causing NAND gate 196 to go low. This causes transistor Q3 to become saturated such that its collector output is pulled to a +5 volt level. This, in turn, causes transistor Q1 to become saturated pulling its collector voltage to the −12 volt reference level. This voltage level is divided down by resistor divider network R17 and R24 to provide the −1.3 volt output to coax 12 during the third quarter of the bit time.

During the fourth quarter of the bit time $\overline{\text{SERDAT1}}$ goes low thereby causing NAND gate 196 to go high turning off transistor Q3. However, $\overline{\text{SERDAT}}$ remains high keeping NAND gate 194 low. When gate 194 is low transistor Q4 is saturated pulling its collector voltage to +5 volts. When this occurs and transistor Q3 is off, transistor Q1 changes from its saturated mode to its forward active region. Diode D3 fixes that when divided by divider network R17 and R24 the ultimately transmitted signal is at a −0.8 volt level.

The operation of transmitter level converter 52 continues in the same manner for each of the data signals to be transmitted as can be appreciated by further review of the timing chart of FIG. 8. One shot multivibrator 202 operates to flash LED 204 during data transmission. In the preferred embodiment transistor Q1 is a 2N4275 component, and transistors Q2-Q4 are 2N5771 components. Resistors R12 and R20 are 240 ohm resistors. Resistors R13 and R15 are 1.5K ohm resistors as are resistors R14, R18, R23 and R22. Resistors R16 and R17 are 390 ohm resistors whereas resistor R24 is a 91 ohm resistor which also serves to terminate coax 12 and prevent reflections. Resistors R21 and R23 are 470 ohm resistors and resistors R31 and R19 are 2.7K ohm resistors. Diodes D1 and D2 are 1N4152 components. It should be understood that these values are given by way of example only and not in a limiting sense because one skilled in the art will realize that other components and values may be used to achieve the same results in substantially the same way as the circuitry set forth in this preferred but not exclusive embodiment.

SUMMARY

It can now be appreciated that the present invention allows a plurality of different types of peripheral units to be used in connection with a computer system using IBM series 3274/3276 control units or other types of control units using serial data transmissions in which each bit is defined by a mid-bit transmission. The industry refers to these control units as types A. Consequently, those users having peripheral devices which are made to communicate with other types of control units, such as the IBM type B control units, can use the interface of this invention and obtain all of the benefits of the new type A control units while still using its older peripheral devices. While the present invention is directed primarily to interface with these new IBM control units, various aspects of the invention will find applicability in other data communication systems.

Applicant's interface 10 is extremely efficient both in terms of high speed and minimal costs. It has the capability of accurately translating serial biphase data transmitted at very fast rates and at relatively low voltage levels. The bi-directional use of ROM-latch 24 and its associated circuitry such as mode control logic 22 permit the interface to be manufactured on a limited number of circuit boards. As one skilled in the art will appreciate, this dramatically limits production costs and enables the interface to be used in a wide variety of environments in which space is a critical factor.

The interface of this invention further possesses great flexibility in that it can be used with a variety of different peripheral devices such as printers, video terminals, etc. One skilled in the art will appreciate other advantages of this invention after studying the specification, drawings and following claims.

I claim:

1. An interface for data communication systems using serial biphase transmissions between a central control unit and a peripheral device, each transmission including a predefined header sequence followed by one or more data words in which each logical bit is defined by half bits of different voltage levels, said interface comprising:
   bi-directional translator means for translating serial biphase transmission from the control unit to TTL compatible parallel data used to control the operation of the peripheral device, said translator including means for detecting the voltage levels of each half bit of the biphase transmission, and sequencer means for generating an output as a function of current detected voltage levels and previously detected levels of the biphase transmission, said translator being further operative to translate TTL compatible parallel data from the peripheral device into biphase serial data for transmission to the control unit.

2. The interface of claim 1 wherein said translator further comprises:
   means for detecting the receipt of the correct header sequence from the control unit before said parallel data is translated; and
   said translator being further operative to generate the correct header sequence prior to transmission of said biphase serial data to said control unit.

3. An interface for data communication systems using biphase serial transmissions to communicate between a central control unit and a peripheral device, said interface comprising:
   voltage level converter means for converting serial biphase data transmissions from the control unit to serial TTL compatible data;
   sequencer means including a programmable memory having a plurality of address input lines and a plurality of data output lines, operative to step through a sequence of memory addressing steps and provide a preselected code on its data output lines for a given code on its address input lines as a function of the contents of the memory location addressed;
   means for coupling the output of the voltage level converter to at least one address input line of the memory;
   clock means for generating a sequencer clock pulse at least once during each half-bit of the biphase data transmission;
   means for coupling the sequencer clock pulses to the sequencer so that each memory addressing step occurs at substantially the half-bit biphase data transmission rate;
   serial to parallel shift register means having an input coupled to the output of the voltage level converter, operative to sequentially load parallel storage locations with a signal level corresponding to the signal level at its input at the time a shift register clock signal is received at a clock input thereof;
   means for coupling at least one of the memory data output lines to the clock input of said shift register, said memory being adapted to generate shift register clock signals on said data output line when given memory locations have been addressed after said sequencer has progressed through a given sequence of memory addressing steps, said shift register clock signals being generated during one half of the biphase bit time whereby each serial biphase data word is converted into a TTL compatible parallel data word; and
   means for coupling the output of the shift register to the peripheral device.

4. The interface of claim 3 wherein said sequencer comprises a ROM-latch combination having a read only memory with a plurality of address input lines and a plurality of data output lines; multibit latch means having a plurality of input lines a subset of which are coupled to a subset of the data output lines from the memory, said latch having a plurality of data output lines; and means for feeding back a subset of the latch output lines to selected address input lines of the memory; the output of the voltage level converter being connected to another address input line of the memory whereby the current address of the memory is a function of both the previously generated code on its data output lines and the current state of the signal level from the voltage level converter.

5. The interface of claim 4 wherein each biphase data transmission includes a predefined header sequence followed by a data word and ending with a predefined ending sequence, and wherein said ROM-latch will generate said shift register clock signals only after the correct header sequence has been received whereby only valid data bits are shifted into shift register means.

6. The interface of claim 5 which further comprises:
   receiver register means having input lines coupled to the output of said shift register; and
   wherein said ROM-latch is operative to generate a latch clock signal for parallel loading the contents of the shift register into said receiver register when the last valid bit of each data word has been received.

7. The interface of claim 6 which further comprises:
   controller means for performing certain operations as a function of the data word in the receiver register; and
   wherein said latch clock signal is operative to set a flag to initiate said operations when a valid data word is loaded into said receiver register.

8. The interface of claim 6 wherein the last bit of each data word is a parity bit, and wherein said interface further comprises:
   parity checker means coupled to said shift register for providing a parity check signal as a function of the sum of the bits therein;
   means for coupling said parity check signal to another address input line of said ROM-latch; and
   wherein said ROM-latch will generate said latch clock signal if the signal levels of said parity check signal and the output of said voltage level converter are the same for the last bit of the data word.

9. An interface for data communication systems using biphase serial transmissions to communicate between a central control unit and a peripheral device, said interface comprising:
   parallel to serial shift register means for temporarily storing a parallel data word from the peripheral device;
   sequencer means including a programmable memory having a plurality of address input lines and a plurality of data output lines, operative to step through a sequence of memory addressing steps and provide a preselected code on its data output lines for a given code on its address input lines as a function of the contents of the memory locations addressed;
   means for coupling a serial output line of the shift register means to at least one address input line of the memory;
   clock means for generating sequencer clock pulses at substantially the half-bit biphase data transmission rate;
   means for coupling the sequencer clock pulses to the sequencer so that each memory addressing step occurs at the half-bit biphase data transmission rate;
   said sequencer being operative to provide on one of said memory output lines a serial biphase data word corresponding to the parallel data word in said shift register; and
   means for coupling the biphase serial data word to the control unit.

10. The interface of claim 9 wherein said sequencer comprises a ROM-latch combination having a read only memory with a plurality of address input lines and a plurality of data output lines; multibit latch means having a plurality of input lines a subset of which are coupled to a subset of the data output lines from memory, said latch having a plurality of data output lines; and means for feeding back a subset of the latch output lines to selected address input lines of the memory; the serial output of said shift register means being connected to another address input line of the memory whereby each address of the memory is a function of both the previously generated data on the memory output lines and the current state of the signal level from the shift register.

11. The interface of claim 10 wherein said ROM-latch is operative to generate a given biphase header sequence to accompany the transmission of said biphase serial data words.

12. An interface for data communication systems using biphase serial transmissions to communicate between a central control unit and a peripheral device, said interface comprising:
   a programmable read only memory with a plurality of address input lines and a plurality of data output lines;
   multibit latch means having a plurality of input lines a subset of which are coupled to a subset of the data output lines from the memory, said latch having a plurality of data output lines; means for feeding back a subset of the latch output lines to selected address input lines of the memory;
   voltage level converter means for converting serial biphase data transmissions from the control unit to serial TTL compatible data;
   a dual mode serial in-parallel out/parallel in-serial out shift register means having a serial input, a serial output, a group of parallel input/output lines and a clock input;
   first multiplexor means for selectively coupling the output of said voltage level converter and said serial output of said shift register to a selected address input line of the memory;
   receiver clock means for generating a clock pulse at least once during each half-bit of the biphase data transmission received from the control unit;
   transmitter clock means for generating clock pulses at substantially the half bit transmission rate;
   second multiplexor means for selectively coupling said receiver clock and transmitter clock to a clock input of said latch to thereby control the timing of each memory addressing step;
   means for coupling a selected data output line from the memory of the clock input of said shift register;
   means for controlling said first and second multiplexors depending upon whether data is being received or transmitted; and
   whereby said voltage level converter is coupled to the memory and the receiver clock is coupled to the latch when serial biphase transmissions are received from the control unit to thereby generate TTL compatible parallel data on the group of shift register input/output lines for use by the peripheral, and wherein the serial output of the shift register is coupled to the memory and the transmitter clock is coupled to the latch means when TTL compatible data from the peripheral is supplied to the group of shift register input/output lines to thereby generate serial biphase data for transmission back to the control unit.

13. A receiver clock generator circuit for providing clock pulses to components of an interface circuit in synchronism with biphase serial data transmissions from a central control unit, said circuit comprising:

voltage level converter means for converting said biphase transmissions to a first series of TTL compatible level signals;

delay means for delaying the converted TTL signals for a period substantially less than a predefined half-bit time for the biphase transmissions thereby providing a second series of TTL level signals;

comparator means for comparing said first and second series of TTL level signals, operative to provide a pulse when the signals are different;

counter means having a reset input coupled to the output of said comparator means, operative to provide an output pulse after a given time period unless reset by a pulse from said comparator means; and means for combining the pulses from the comparator means and the counter means to provide clock signals for the interface, said clock signals being derived from the comparator means when there is a transition of the signal level in the biphase transmissions and being derived from the counter means when such transitions do not occur at regularly spaced time intervals.

14. The circuit of claim 13 which further comprises:

a source of independently generated clock pulses which occur at a rate substantially faster than the half-bit transmission rate of the biphase transmissions;

said delay means including a pair of interconnected flip flops each being clocked by said clock pulses from the source, a first flip flop having an input coupled to the output of the voltage level converter and an output connected to the input of a second flip flop, the output of said first flip flop providing said first series of said TTL level signals and the output of said second flip flop providing said second series of said TTL level signals.

15. The circuit of claim 13 wherein said counter means comprises a binary counter having a clock input connected to said source, and a load input connected to the output of said combining means, operative to provide a pulse at its output after receipt of N clock pulses after being reset by a signal from the comparator means, and further operative to provide a pulse at its output after receiving N−1 clock pulses from the source after receiving a signal only on its load input from the combining means;

whereby the slight delay in the generation of the first output pulse from the counter permits a certain amount of timing error in the biphase transmission to be tolerated.

16. The circuit of claim 15 wherein N is the equivalent of about 265 nanoseconds and wherein N−1 is the equivalent of about 212 nanoseconds.

17. A waveform generator for converting TTL serial data signals from an interface into biphase serial data signals having perscribed waveforms for transmission to a central control unit, said waveform generator comprising:

first transistor means for providing positive signal levels;

second transistor means for providing negative signal levels;

logic network means for placing said first transistor into saturation for about a quarter of a preselected bit time whenever there is a positive going transition of the TTL signals thereby providing a positive predistortion pulse, said logic network means being further operative to place said first transistor into its forward activate region for generating a given positive signal level until there is a negative going transaction of the TTL signals; and said logic network means being further operative to place said second transistor into saturation for about a quarter of the bit time whenever there is a negative going transition of the TTL signals thereby providing a negative predistortion pulse, said logic network means being also adapted to place said second transistor into its forward active region to provide a given negative signal level until there is a positive going transition of the TTL signals.

18. The waveform generator of the claim 17 which further includes a first diode coupled to the output of said first transistor operative to maintain the voltage thereof at a predetermined level when in its forward active region; and a second diode connected to the output of said second transistor operative to maintain the voltage thereof at a predetermined level when in its forward active region.

19. The waveform generator of claim 18 which further comprises:

a pair of interconnected flip flops each being clocked by clock pulses at about four times the data transmission rate, a first flip flop of the pair having an input connected to said TTL serial data signals and having Q and $\overline{Q}$ outputs; a second flip flop of the pair having an input coupled to the Q output of said first flip flop, said second flip flop having Q and $\overline{Q}$ outputs; and wherein the outputs of said first and second flip flops are connected to said logic network means for selectively controlling the generation of the biphase data signals.

20. The waveform generator of claim 19 wherein said positive and negative predistortion pulses are about +1.3 volts and −1.3 volts, respectively; and wherein said first and second transistors generate signal levels of about +0.8 volts and −0.8 volts when in their forward active region.

* * * * *